(12) United States Patent
Sasaki et al.

(10) Patent No.: US 10,414,293 B2
(45) Date of Patent: Sep. 17, 2019

(54) VEHICLE SEAT

(71) Applicant: NHK SPRING CO., LTD., Yokohama-shi (JP)

(72) Inventors: Yoshitaka Sasaki, Yokohama (JP); Akira Honma, Yokohama (JP); Donhyon Kim, Yokohama (JP); Daisuke Tanaka, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/868,405

(22) Filed: Jan. 11, 2018

(65) Prior Publication Data
US 2018/0201162 A1    Jul. 19, 2018

(30) Foreign Application Priority Data

Jan. 18, 2017 (JP) ................................ 2017-007059

(51) Int. Cl.
| | |
|---|---|
| *B60N 2/20* | (2006.01) |
| *B60N 2/16* | (2006.01) |
| *B60N 2/18* | (2006.01) |
| *B60N 2/22* | (2006.01) |
| *B60N 2/30* | (2006.01) |
| *B60N 2/02* | (2006.01) |
| *B60N 2/24* | (2006.01) |

(52) U.S. Cl.
CPC ........... *B60N 2/1695* (2013.01); *B60N 2/161* (2013.01); *B60N 2/181* (2013.01); *B60N 2/20* (2013.01);
(Continued)

(58) Field of Classification Search
CPC ...... B60N 2/1695; B60N 2/16; B60N 2/1615; B60N 2/181; B60N 2/18; B60N 2/1821;
(Continued)

(56) References Cited

U.S. PATENT DOCUMENTS

| | | | | |
|---|---|---|---|---|
| 3,330,598 A | * | 7/1967 | Whiteside ................ | A47C 4/54 297/284.3 |
| 4,965,899 A | * | 10/1990 | Sekido ................... | B60N 2/665 297/284.6 |

(Continued)

FOREIGN PATENT DOCUMENTS

| | | |
|---|---|---|
| JP | U H05-009351 | 2/1993 |
| JP | U H05-020649 | 3/1993 |
| JP | A 2015-066969 | 4/2015 |

*Primary Examiner* — Mark R Wendell
(74) *Attorney, Agent, or Firm* — Knobbe, Martens, Olson & Bear, LLP

(57) ABSTRACT

A vehicle seat including a seat cushion including a cushion body that supports buttocks of an occupant, and cushion side portions disposed on both seat width direction sides of the cushion body, a seatback including a back body that supports a back of the occupant, and back side portions disposed on both seat width direction sides of the back body, and an adjustment mechanism including at least one of a cushion adjustment mechanism that on actuation moves the cushion body in a seat up-down direction with respect to the cushion side portions and pivots the cushion body about an axis running along the seat width direction, or a back adjustment mechanism that on actuation moves the back body in a seat front-rear direction with respect to the back side portions and pivots the back body about an axis running along the seat width direction.

7 Claims, 21 Drawing Sheets

(52) U.S. Cl.
CPC ......... *B60N 2/2209* (2013.01); *B60N 2/2222* (2013.01); *B60N 2/3084* (2013.01); *B60N 2/3086* (2013.01); *B60N 2002/024* (2013.01); *B60N 2002/0256* (2013.01); *B60N 2002/247* (2013.01)

(58) Field of Classification Search
CPC .. B60N 2/1814; B60N 2/1817; B60N 2/1835; B60N 2/1842; B60N 2/185; B60N 2/20; B60N 2/2209; B60N 2/2222; B60N 2/0284; B60N 2/643; B60N 2/646; B60N 2/505; B60N 2/4263
USPC ....... 297/313, 311, 312, 315, 330, 314, 338, 297/284.1, 284.3, 284.9
See application file for complete search history.

(56) References Cited

U.S. PATENT DOCUMENTS

| | | | | |
|---|---|---|---|---|
| 5,013,087 A * | 5/1991 | Nagasaka | ............... | A47C 7/462 297/284.1 |
| 7,093,899 B2 * | 8/2006 | Fisher | ................... | B60N 2/3065 297/334 |
| 2002/0060485 A1 * | 5/2002 | Fischer | ................ | B60N 2/2222 297/284.4 |
| 2005/0242634 A1 * | 11/2005 | Serber | ................... | B60N 2/0745 297/216.1 |
| 2009/0322133 A1 * | 12/2009 | Yamada | ............... | B60N 2/3011 297/284.9 |
| 2011/0285189 A1 * | 11/2011 | Petzel | ..................... | B60N 2/56 297/284.1 |
| 2012/0169099 A1 * | 7/2012 | Horiguchi | ............ | B60N 2/0232 297/314 |
| 2015/0084390 A1 * | 3/2015 | Tanaka | ................... | B60N 2/643 297/338 |
| 2015/0203011 A1 * | 7/2015 | Fujita | ....................... | B60N 2/68 297/284.11 |
| 2015/0352979 A1 * | 12/2015 | O'Bannon | ........... | B60N 2/0248 701/49 |
| 2015/0367756 A1 * | 12/2015 | Katoh | ................... | B60N 2/666 297/285 |

* cited by examiner

VEHICLE SEAT

CROSS-REFERENCE TO RELATED APPLICATION

This application is based on and claims priority under 35 USC 119 from Japanese Patent Application No. 2017-007059 filed on Jan. 18, 2017, the disclosure of which is incorporated by reference herein.

BACKGROUND

Technical Field

The present disclosure relates to a vehicle seat.

Related Art

The shape-adjustable seat described in Japanese Utility Model Application Laid-Open (JP-U) No. H05-9351 includes a seat cushion and a seatback, each provided with a flat plate shaped top plate fixed so as to be fitted between a pair of left and right side sections. A seat pad of each top plate is formed with plural holes running along the seat width direction. Insertable/removable seat-shape adjustment rods of different diameters to each other are press-fitted into the holes. The shape of the vehicle seat is thereby adjusted according to the build and preferences of a person sitting thereon.

The shape-adjustable seat described in JP-U No. H05-20649 includes a seat cushion and a seatback each including a top plate, similarly to as described above. Seat shape adjusting air-bags, capable of drawing in and expelling air and capable of sealing in the air, are housed in plural holes formed in the top plates. Thereby, in addition to exhibiting similar effects to those of Patent Document 1, the moderate cushioning properties of the air-bags make sitting comfortable.

The vehicle seat described in Japanese Patent Application Laid-Open (JP-A) No. 2015-066969 includes a first displacement mechanism that, when actuated, is capable of changing a seat up-down direction position of a seat cushion body with respect to a cushion side section, and a second displacement mechanism that, when actuated, is capable of changing a seat front-rear direction position of a seatback body with respect to a back side section. An occupant's sense of being held is thus easily modified.

SUMMARY

The shape-adjustable seats described in JP-U Nos. H05-9351 and H05-20649 involve complex operations to insert or remove the seat-shape adjustment rods from the plural holes formed in the top plates, and complex operations to inject or expel air in the seat shape-adjusting air-bags. Moreover, since these shape-adjustable seats are not capable of making large changes to the shape of the vehicle seat, room for improvement remains from the perspective adjusting between a wide range of occupant seating postures.

The vehicle seat described in JP-A No. 2015-066969 is easy to adjust since the up-down position of the seat cushion body and the front-rear position of the seatback body are adjusted by actuating the first displacement mechanism and the second displacement mechanism. However, only the up-down position of the seat cushion body and the front-rear position of the seatback body are changed, thus leaving room for improvement from the perspective of adjusting between a wide range of occupant seating postures.

In consideration of the above circumstances, the present disclosure is provides a vehicle seat capable of adjusting between a wide range of occupant seating postures.

A vehicle seat according to a first aspect includes a seat cushion, a seatback, and an adjustment mechanism. The seat cushion includes a cushion body that supports buttocks of an occupant, and cushion side portions disposed on both seat width direction sides of the cushion body. The seatback includes a back body that supports a back of the occupant, and back side portions disposed on both seat width direction sides of the back body. The adjustment mechanism includes at least one of a cushion adjustment mechanism or a back adjustment mechanism. On actuation, the cushion adjustment mechanism moves the cushion body in a seat up-down direction with respect to the cushion side portions and pivots the cushion body about an axis running along the seat width direction. On actuation, the back adjustment mechanism moves the back body in a seat front-rear direction with respect to the back side portions and pivots the back body about an axis running along the seat width direction.

In the vehicle seat of the first aspect, the buttocks of the occupant are supported by the cushion body of the seat cushion, and the back of the occupant is supported by the back body of the seatback. The cushion side portions are disposed on both seat width direction sides of the cushion body, and the back side portions are disposed on both seat width direction sides of the back body.

The vehicle seat includes the adjustment mechanism including at least one of the cushion adjustment mechanism or the back adjustment mechanism. On actuation, the cushion adjustment mechanism moves the cushion body in the seat up-down direction with respect to the cushion side portions and pivots (tilts) the cushion body about an axis running along the seat width direction. This thereby enables not only the up-down position, but also the incline angle of the cushion body, to be changed with respect to the cushion side portions. Moreover, on actuation, the back adjustment mechanism moves the back body in the seat front-rear direction with respect to the back side portions and pivots (tilts) the back body about an axis running along the seat width direction. This thereby enables not only the front-rear position, but also the incline angle of the back body, to be changed with respect to the back side portions. The present disclosure is thus capable of adjusting between a wide range of occupant seating postures.

A vehicle seat according to a second aspect is the vehicle seat of the first aspect, wherein the cushion adjustment mechanism includes a front link and a rear link. One end portion of the front link is rotatably coupled to a frame of the seat cushion and another end portion of the front link is rotatably coupled to the cushion body. The rear link is disposed further toward a seat rear side than the front link, and includes a first rear link and a second rear link having respective one end portions rotatably coupled to each other, with another end portion of the first rear link being rotatably coupled to the frame of the seat cushion and another end portion of the second rear link being rotatably coupled to the cushion body. Moreover, the back adjustment mechanism includes an upper link and a lower link. One end portion of the upper link is rotatably coupled to a frame of the seatback and another end portion of the upper link is rotatably coupled to the back body. The lower link is disposed further to a seat lower side than the upper link, and includes a first lower link and a second lower link having respective one end portions rotatably coupled to each other, with another end portion of the first lower link being rotatably coupled to the frame of the seatback and another end portion of the second lower link being rotatably coupled to the back body.

In the vehicle seat of the second aspect, the cushion adjustment mechanism includes the front link and the rear link including the first rear link and the second rear link. In the cushion adjustment mechanism, one of the first rear link or the second rear link is capable of functioning as a parallel link mechanism together with the front link. This thereby enables the cushion body to be moved in the seat up-down direction with respect to the cushion side portions. Moreover, when the other out of the first rear link or the second rear link is rotated with respect to the one of the first rear link or the second rear link, the cushion body is pivoted about a coupling portion with the front link. Configuring the cushion adjustment mechanism employing the links to move the cushion body in the seat up-down direction with respect to the cushion side portions and pivot the cushion body about an axis running along the seat width direction enables a simple configuration to be achieved for the cushion adjustment mechanism.

Similarly, the back adjustment mechanism includes the upper link and the lower link including the first lower link and the second lower link. In the back adjustment mechanism, one of the first lower link or the second lower link is capable of as functioning as a parallel link mechanism together with the upper link. This thereby enables the back body to be moved in the seat front-rear direction with respect to the back side portions. Moreover, when the other of the first lower link or the second lower link is rotated with respect to the one of the first lower link or the second lower link, the back body is pivoted about a coupling portion with the upper link. Configuring the back adjustment mechanism employing the links to move the back body in the seat front-rear direction with respect to the back side portions and pivot the back body about an axis running along the seat width direction enables a simple configuration to be achieved for the back adjustment mechanism.

A vehicle seat according to a third aspect is the vehicle seat of the first aspect, further including a controller that actuates the at least one of the cushion adjustment mechanism or the back adjustment mechanism such that the at least one of the cushion adjustment mechanism or the back adjustment mechanism adopts a mode selected from plural pre-stored modes.

In the vehicle seat of the third aspect, the controller actuates the at least one of the cushion adjustment mechanism or the back adjustment mechanism such that the at least one of the cushion adjustment mechanism or the back adjustment mechanism adopts the state of a mode selected from the plural pre-stored modes. Accordingly, the occupant need only select the desired mode from the plural modes in order to adjust their seating posture, greatly facilitating adjustment of the seating posture.

A vehicle seat according to a fourth aspect is the vehicle seat of the third aspect, wherein the adjustment mechanism includes both the cushion adjustment mechanism and the back adjustment mechanism. In cases in which either one or both of the cushion adjustment mechanism and the back adjustment mechanism are not in a state corresponding to a baseline mode when a mode other than the baseline mode has been selected from the plural modes, the controller actuates the one or both of the cushion adjustment mechanism and the back adjustment mechanism so as to adopt the baseline mode state, and then actuates the one or both of the cushion adjustment mechanism and the back adjustment mechanism so as to adopt a state corresponding to the selected mode In the vehicle seat of the fourth aspect, in cases in which either one or both of the cushion adjustment mechanism and the back adjustment mechanism are not in the baseline mode state when a mode other than the baseline mode has been selected from out of the plural pre-stored modes, first, the controller of the adjustment mechanism actuates the one or both of the cushion adjustment mechanism and the back adjustment mechanism so as to adopt the baseline mode state, and then actuates the one or both of the cushion adjustment mechanism and the back adjustment mechanism so as to adopt the state corresponding to the selected mode. This thereby enables the cushion body and the back body to be prevented from interfering with each other, for example during actuation of the cushion adjustment mechanism and/or the back adjustment mechanism.

A vehicle seat according to a fifth aspect is the vehicle seat of the third aspect, wherein the controller moves the cushion body in a seat upward direction and then pivots the cushion body in cases in which the cushion body is both moved in the seat upward direction and pivoted by the cushion adjustment mechanism. The controller pivots the cushion body and then moves the cushion body in a seat downward direction in cases in which the cushion body is both moved in the seat downward direction and pivoted by the cushion adjustment mechanism. The controller moves the back body in a seat front direction and then pivots the cushion body in cases in which the back body is both moved in the seat front direction and pivoted by the back adjustment mechanism. Moreover, the controller pivots the back body and then moves the back body in a seat rear direction in cases in which the back body is both moved in the seat rear direction and pivoted by the back adjustment mechanism.

In the vehicle seat of the fifth aspect, the cushion body is moved in the seat upward direction and then pivoted about the axis running along the seat width direction in cases in which the cushion adjustment mechanism both moves the cushion body in the seat upward direction and pivots the cushion body about an axis running along the seat width direction. The cushion body is moved in the seat downward direction and then pivoted about the axis running along the seat width direction in cases in which the cushion adjustment mechanism both moves the cushion body in the seat downward direction and pivots the cushion body about an axis running along the seat width direction. This thereby enables any discomfort caused to the occupant during actuation of the cushion adjustment mechanism to be reduced.

Moreover, in the vehicle seat, the back body is moved in the seat front direction and then pivoted about the axis running along the seat width direction in cases in which the back adjustment mechanism both moves the back body in the seat front direction and pivots the back body about an axis running along the seat width direction. The back body is pivoted about the axis running along the seat width direction and then moved in the seat rear direction in cases in which the back adjustment mechanism both moves the back body in the seat rear direction and pivots the back body about an axis running along the seat width direction. This thereby enables any discomfort caused to the occupant during actuation of the back adjustment mechanism to be reduced.

A vehicle seat according to a sixth aspect is the vehicle seat according to the third aspect, further including a reclining mechanism that on actuation pivots the seatback with respect to the seat cushion. In cases in which the at least one of the cushion adjustment mechanism or the back adjustment mechanism is not in a state corresponding to a baseline mode when there has been an actuation request for the reclining mechanism, the controller actuates the at least one of the cushion adjustment mechanism or the back adjustment mechanism so as to adopt the baseline mode state before actuating the reclining mechanism.

In the vehicle seat of the sixth aspect, when there has been an actuation request for the reclining mechanism, the controller first actuates the at least one of the cushion adjustment mechanism or the back adjustment mechanism so as to adopt the state corresponding to the baseline mode out of the plural modes before actuating the reclining mechanism. This thereby enables any discomfort caused to the occupant during actuation of the reclining mechanism to be reduced.

A vehicle seat according to a seventh aspect includes a seat cushion, a seatback, and an adjustment mechanism. The seat cushion includes a cushion body that supports buttocks of an occupant, and cushion side portions disposed on both seat width direction sides of the cushion body. The seatback includes a back body that supports a back of the occupant, and back side portions disposed on both seat width direction sides of the back body. The adjustment mechanism includes at least one of a cushion adjustment mechanism or a back adjustment mechanism. The cushion adjustment mechanism is capable of moving the cushion body in a seat up-down direction with respect to the cushion side portions and is capable of pivoting the cushion body about an axis running along the seat width direction. The back adjustment mechanism is capable of moving the back body in a seat front-rear direction with respect to the back side portions and is capable of pivoting the back body about an axis running along the seat width direction.

In the vehicle seat of the seventh aspect, the buttocks of the occupant are supported by the cushion body of the seat cushion, and the back of the occupant is supported by the back body of the seatback. The cushion side portions are disposed on both seat width direction sides of the cushion body, and the back side portions are disposed on both seat width direction sides of the back body.

The vehicle seat includes the adjustment mechanism including at least one of the cushion adjustment mechanism or the back adjustment mechanism. The cushion adjustment mechanism is capable of moving the cushion body in the seat up-down direction with respect to the cushion side portions and is capable of pivoting (tilting) the cushion body about an axis running along the seat width direction. This thereby enables not only the up-down position, but also the incline angle, of the cushion body to be changed with respect to the cushion side portions. Moreover, the back adjustment mechanism is capable of moving the back body in the seat front-rear direction with respect to the back side portions and is capable of pivoting (tilting) the back body about an axis running along the seat width direction. This thereby enables not only the front-rear position, but also the incline angle, of the back body to be changed with respect to the back side portions. The present disclosure is thus capable of adjusting between a wide range of occupant seating postures.

As described above, the vehicle seat according to the present disclosure is capable of adjusting between a wide range of occupant seating postures.

BRIEF DESCRIPTION OF THE DRAWINGS

Exemplary embodiments of the present disclosure will be described in detail based on the following figures, wherein.

DETAILED DESCRIPTION

Figure 1:
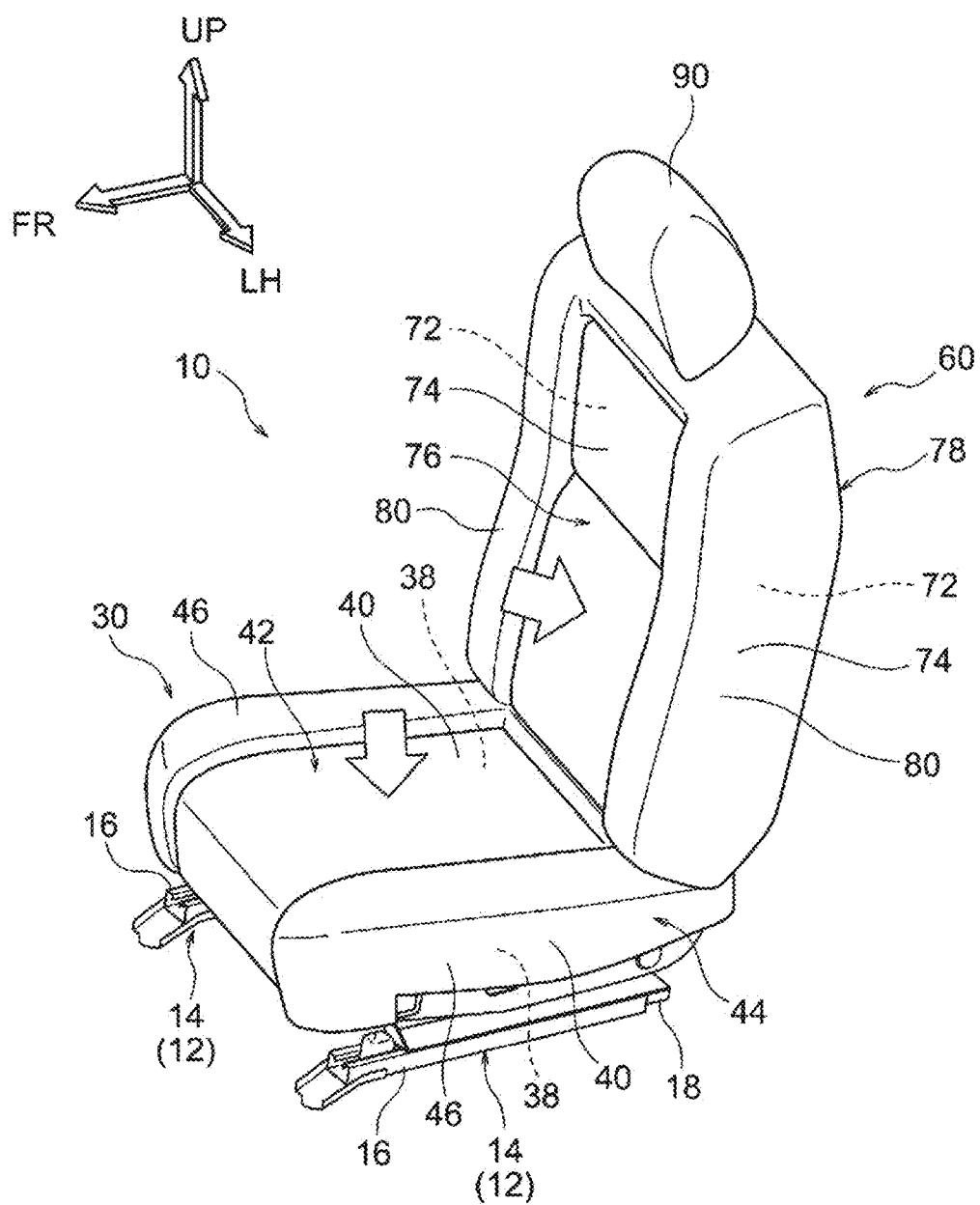
FIG. 1 is a perspective view illustrating a vehicle seat according to an exemplary embodiment of the present disclosure in a state in which a cushion body is disposed at a lowermost position and a back body is disposed at a rearmost position.

Explanation follows regarding a vehicle seat 10 according to an exemplary embodiment of the present disclosure, with reference to FIG. 1 to FIG. 21. Note that in the drawings, the arrow FR indicates a seat front direction of the vehicle seat 10, the arrow UP indicates a seat upward direction of the vehicle seat 10, and the arrow LH indicates a seat left direction (one way in the seat width direction) of the vehicle seat 10 as appropriate. Moreover, in the present exemplary embodiment, the seat front direction, the seat upward direction, and the seat left direction of the vehicle seat 10 respectively correspond to a vehicle front direction, a vehicle upward direction, and a vehicle left direction of a vehicle (automobile) to which the vehicle seat 10 is installed. Moreover, an occupant P1, illustrated in FIG. 13 to FIG. 17, FIG. 19, and FIG. 20 is a male or female of standard build (for example a build equivalent to AM50). The occupant P2 illustrated in FIG. 18 is a female of small build (for example a build equivalent to AF05), and the occupant P3 illustrated in FIG. 21 is a child of smaller build than the occupant P2. The occupants P1 to P3 are also referred to simply as "occupant P" in the following explanation. Note that in each of the drawings, reference numerals are sometimes omitted in order to facilitate viewing of the drawings.

Figure 2:
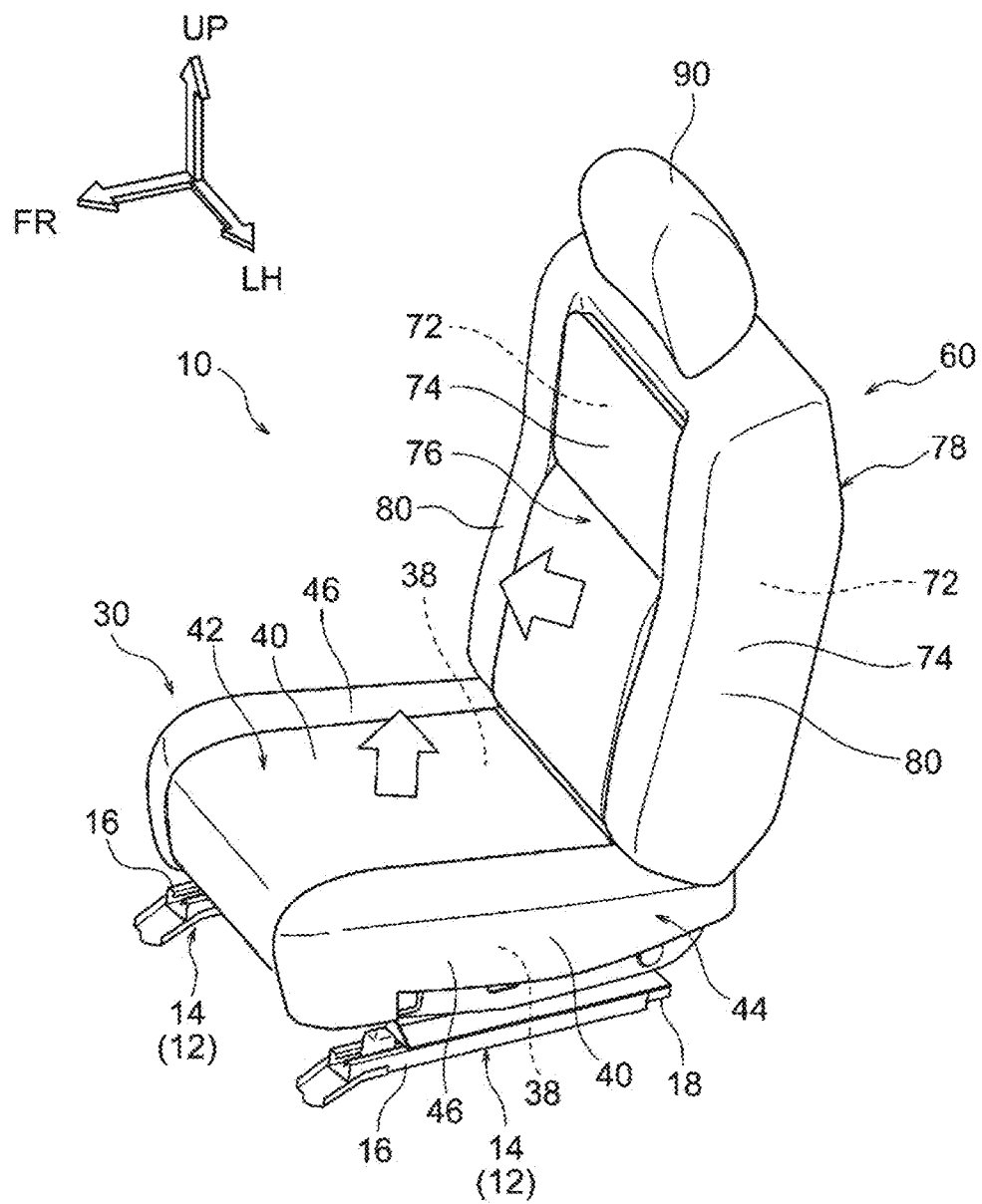
FIG. 2 is a perspective view illustrating a vehicle seat of the present disclosure in a state in which a cushion body is disposed at an up-down baseline position and a back body is disposed at a front-rear baseline position.
Figure 3:
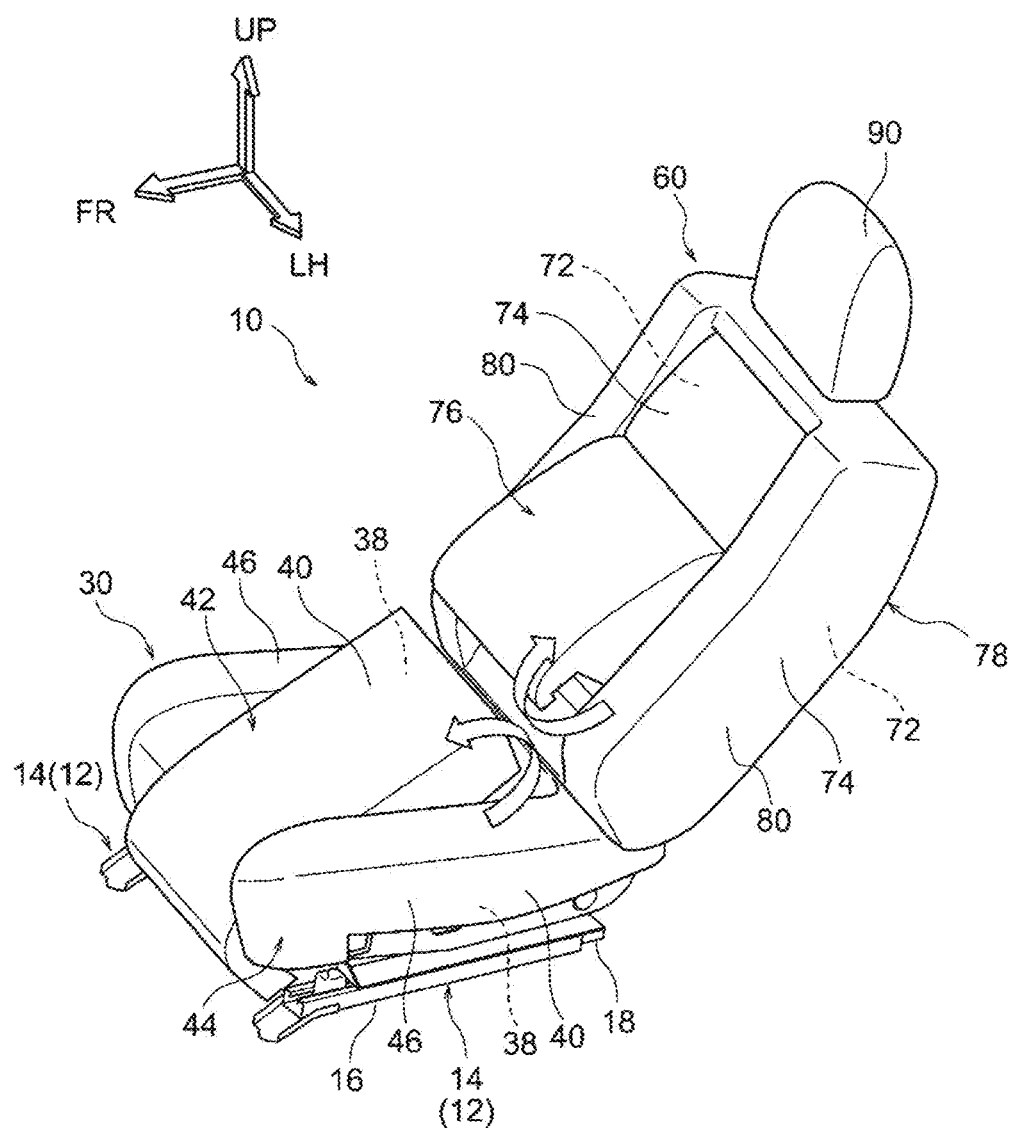
FIG. 3 is a perspective view illustrating a vehicle seat of the present disclosure in a state in which a seatback has been reclined and a cushion body and a back body have been pivoted.

As illustrated in FIG. 1 to FIG. 3, the vehicle seat 10 includes a slide mechanism 12 configuring a lower section of the vehicle seat 10, a seat cushion 30 configuring a seating section of the vehicle seat 10, and a seatback 60 configuring a backrest section of the vehicle seat 10. Moreover, an adjustment mechanism 100 (see FIG. 4 to FIG. 8) is provided inside the vehicle seat 10. The vehicle seat 10 further includes an ECU 230 (see FIG. 12), serving as a controller that controls the adjustment mechanism 100. Explanation follows regarding the respective configurations thereof.

Slide Mechanism 12

As illustrated in FIG. 1 to FIG. 5 and FIG. 7, the slide mechanism 12 includes a pair of left and right slide rails 14. The left and right slide rails 14 are substantially elongated in shape and have a length direction running along the seat front-rear direction. The slide rails 14 are disposed alongside each other in the seat width direction. Each slide rail 14 is configured including a lower rail 16 and an upper rail 18.

The lower rail 16 is formed with a substantially C-shaped cross-section profile opening toward the seat upper side as viewed from the front of the seat, and extends in the seat front-rear direction. A front end portion and a rear end portion of the lower rail 16 are fixed to the vehicle floor. The upper rail 18 is supported so as to be capable of sliding in the seat front-rear direction with respect to the lower rail 16. The slide mechanism 12 is configured such that the upper rail 18 is slid in the seat front-rear direction with respect to the lower rail 16 by drive force from a slide motor 19, illustrated in FIG. 4, FIG. 5, and FIG. 7.

Seat Cushion 30

The seat cushion 30 includes a cushion frame 32 configuring a frame (framework member) of the seat cushion 30. The cushion frame 32 includes a pair of left and right side frames 34. The left and right side frames 34 are disposed at the seat upper sides of the respective slide rails 14. The side frames 34 are, for example, formed by pressing sheet metal, and each has an elongated shape with its length direction along the seat front-rear direction and plate thickness direction disposed in the seat width direction. Moreover, lower end portions of the left and right side frames 34 are coupled to the left and right upper rails 18 through a lifter mechanism, not illustrated in the drawings.

The cushion frame 32 also includes a rear frame 36. The rear frame 36 is, for example, formed from a metal pipe member, and is disposed with its axial direction (length direction) along the seat width direction. The two length direction end portions of the rear frame 36 are joined to rear end portions of the respective side frames 34.

As illustrated in FIG. 1 to FIG. 3, a seat cushion pad 38 is provided at the seat upper side of the cushion frame 32. The seat cushion pad 38 is configured from a foamed material such as urethane, and is split into two parts. Each part of the two-part split seat cushion pad 38 is covered by a cover 40. The seating section of the seat cushion 30 is thereby configured by a cushion body 42 and a cushion outer frame 44.

The cushion body 42 is formed in a substantially rectangular shape as viewed from above the seat, and is disposed at a seat width direction central portion of the seat cushion 30. A cushion pan 42A formed, for example, by pressing sheet metal is provided at a lower face of the cushion body 42. The cushion pan 42A is supported by the cushion frame 32 through a cushion adjustment mechanism 110, described later. The cushion body 42 that includes the cushion pan 42A is primarily configured to support the buttocks of an occupant P (see FIG. 13 to FIG. 21). The cushion outer frame 44 is formed in a substantially U-shape opening toward the front of the seat as viewed from above the seat, and is supported fixed to the cushion frame 32. The cushion body 42 is disposed within the cushion outer frame 44, and portions of the cushion outer frame 44 adjacent to the cushion body 42 on both seat width direction sides configure cushion side portions 46.

Using the adjustment mechanism 100, described later, the cushion body 42 is configured to move (be displaced) in the seat up-down direction and to pivot around an axis running along the seat width direction. Namely, configuration is made such that the up-down position and incline angle of the cushion body 42 can be changed by the adjustment mechanism 100.

Seatback 60

Figure 4:
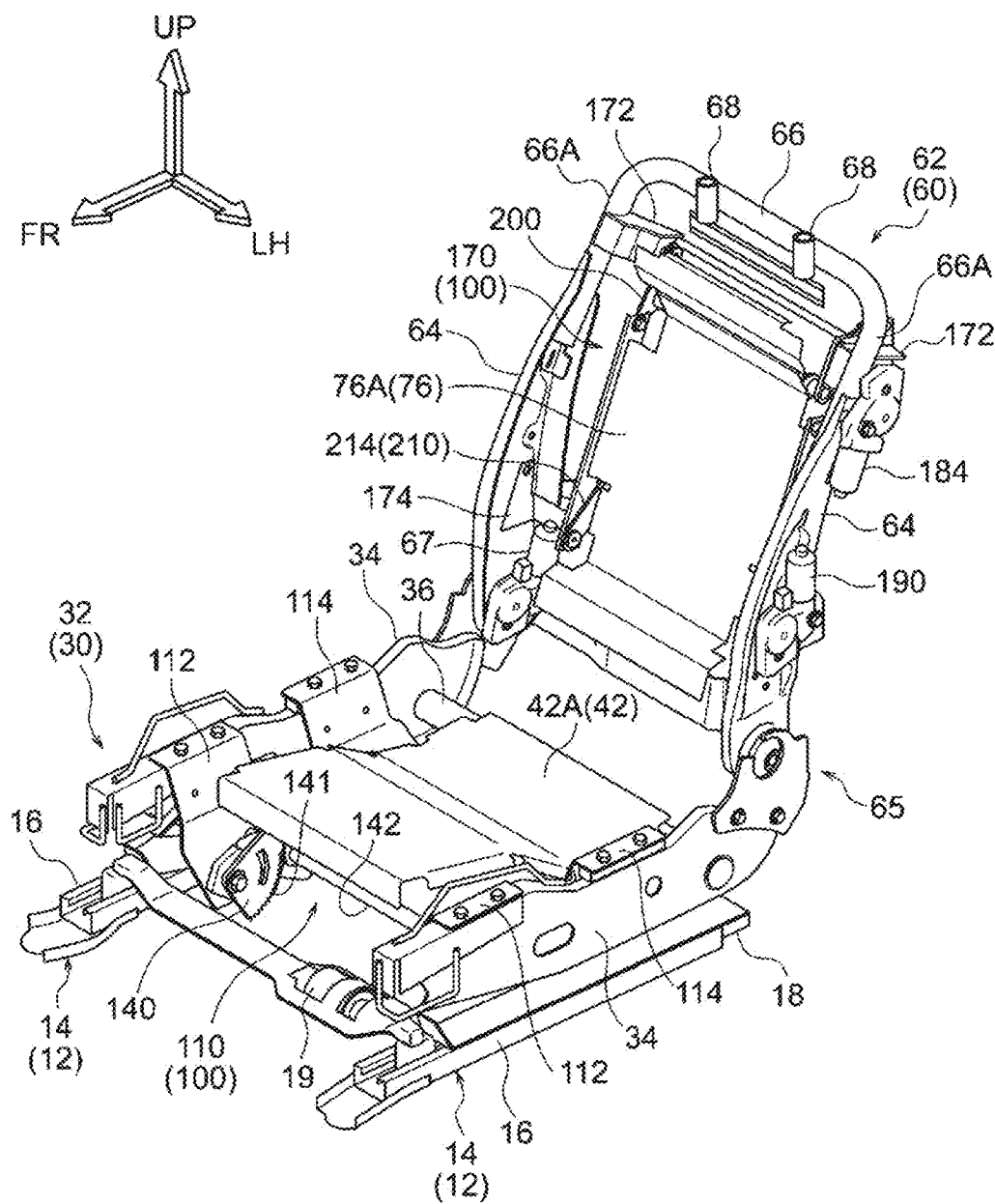
FIG. 4 is a perspective view illustrating a configuration of a cushion frame, a back frame, and an adjustment mechanism of a vehicle seat of the present disclosure.
Figure 6:
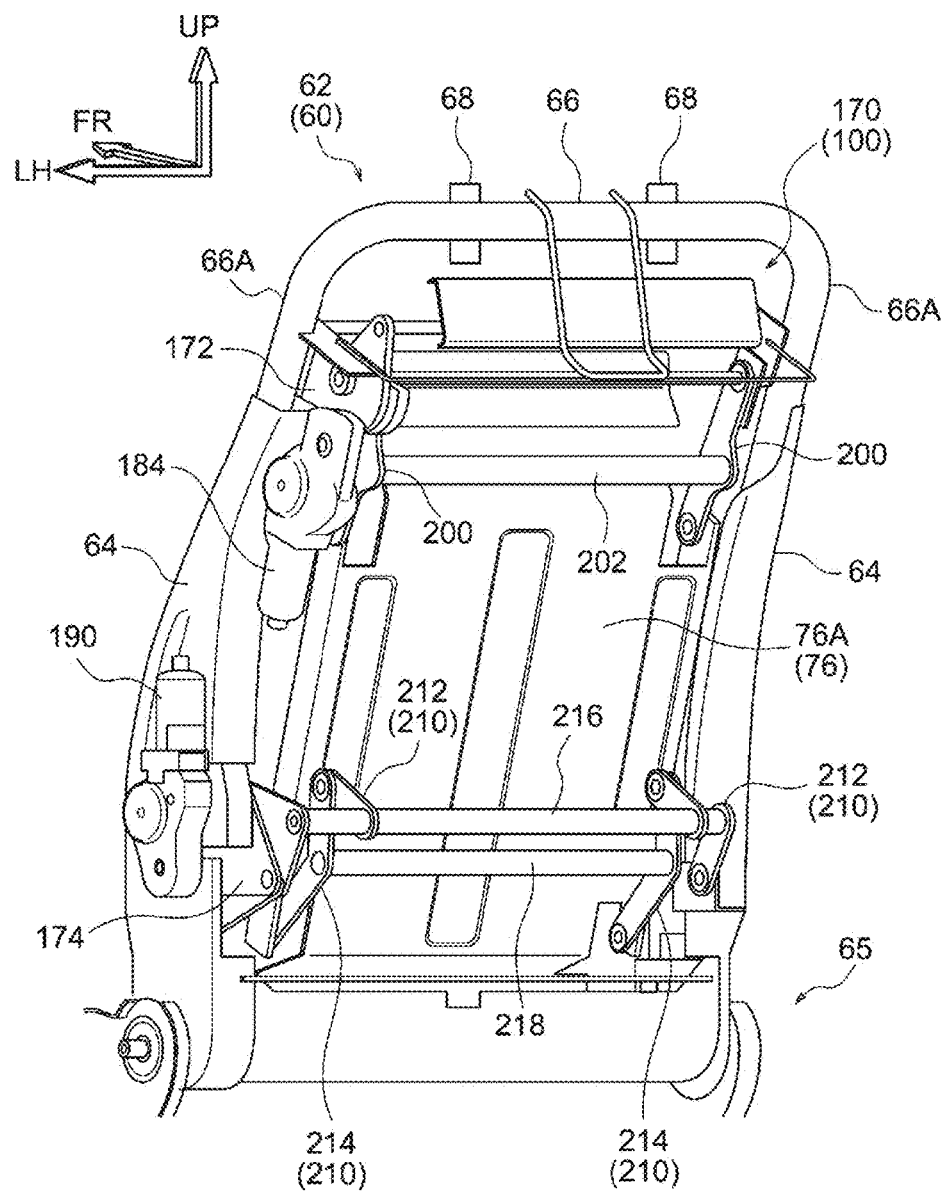
FIG. 6 is a perspective view illustrating a configuration of a back frame and a back adjustment mechanism of a vehicle seat of the present disclosure.
Figure 8:
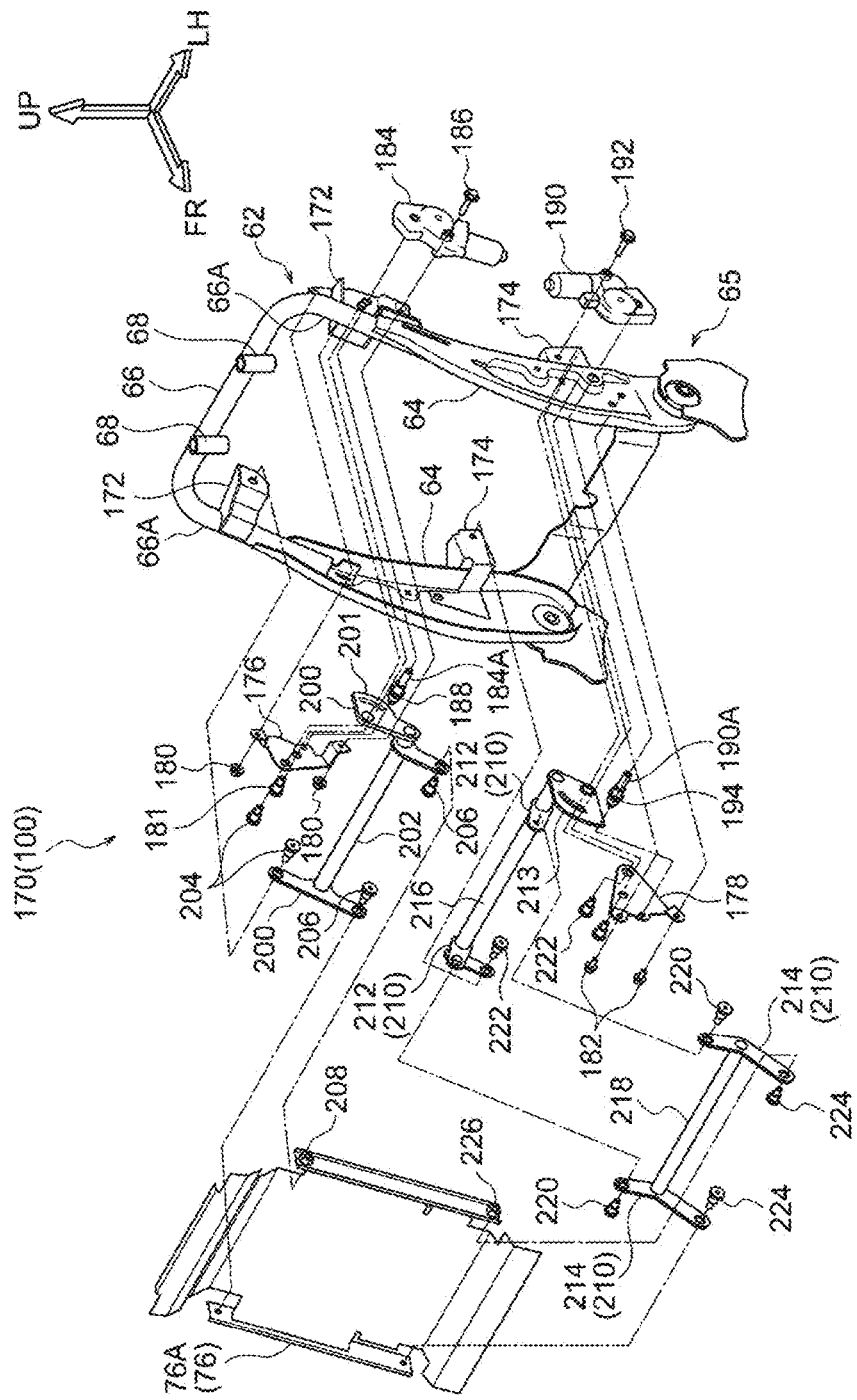
FIG. 8 is an exploded perspective view of a back adjustment mechanism.

The seatback 60 is provided in a state standing upright from a rear end portion of the seat cushion 30. As illustrated in FIG. 4, FIG. 6, and FIG. 8, a back frame 62 configuring a frame (framework member) of the seatback 60 is provided inside the seatback 60. The back frame 62 includes a pair of left and right side frames 64. The left and right side frames 64 are, for example, formed by pressing sheet metal, and each has an elongated shape with its length direction running along the seat up-down direction and plate thickness direction disposed in the seat width direction. Moreover, lower end portions of the left and right side frames 64 are coupled so as to be capable of pivoting with respect to rear end portions of the left and right side frames 34 of the cushion frame 32 through a known reclining mechanism 65. The reclining mechanism 65 is configured to pivot (tilt) the back frame 62 with respect to the cushion frame 32 using drive force from a reclining motor 67, illustrated in FIG. 4.

The back frame 62 further includes an upper frame 66. The upper frame 66 is, for example, configured from a metal pipe member and is formed substantially in an inverted U-shape as viewed from the front of the seat. Left and right legs 66A of the upper frame 66 are joined to upper end portions of the side frames 64 by welding or the like. A pair of left and right support brackets 68 that support a headrest 90 (see FIG. 1 to FIG. 3) are fixed to the upper frame 66.

A seatback pad 72 is provided at the seat front side of the back frame 62, as illustrated in FIG. 1 to FIG. 3. The seatback pad 72 is configured from a foamed material such as urethane, and is split into two parts. Each part of the two-part split seatback pad 72 is covered by a cover 74. The backrest section of the seatback 60 is thereby configured by a back body 76 and a back outer frame 78.

The back body 76 is formed in a substantially rectangular shape as viewed from the front of the seat, and is disposed at a substantially central portion of the seatback 60. A rear face of the back body 76 is provided with a back pan 76A formed, for example, by pressing sheet metal. The back pan 76A is supported on the back frame 62 through an adjustment mechanism 170, described later. The back body 76 that includes the back pan 76A is primarily configured to support of the back of an occupant P (see FIG. 13 to FIG. 21). The back outer frame 78 is formed in a substantially rectangular frame shape as viewed from the front of the seat, and is supported fixed to the back frame 62. The back body 76 is disposed within the back outer frame 78, and portions of the back outer frame 78 on both seat width direction sides of the back body 76 configure back side portions 80.

The back body 76 is configured to move (be displaced) in the seat front-rear direction and to pivot around an axis running along the seat width direction using the adjustment mechanism 100, described later. Namely, configuration is made such that the front-rear position and incline angle of the back body 76 can be changed using the adjustment mechanism 100.

Adjustment Mechanism 100

As illustrated in FIG. 4 to FIG. 8, the adjustment mechanism 100 is configured including the cushion adjustment mechanism 110 that is capable of changing the position of the cushion body 42, the back adjustment mechanism 170 that is capable of changing the position of the back body 76, and the ECU 230, serving as a controller.

Cushion Adjustment Mechanism 110

Figure 5:
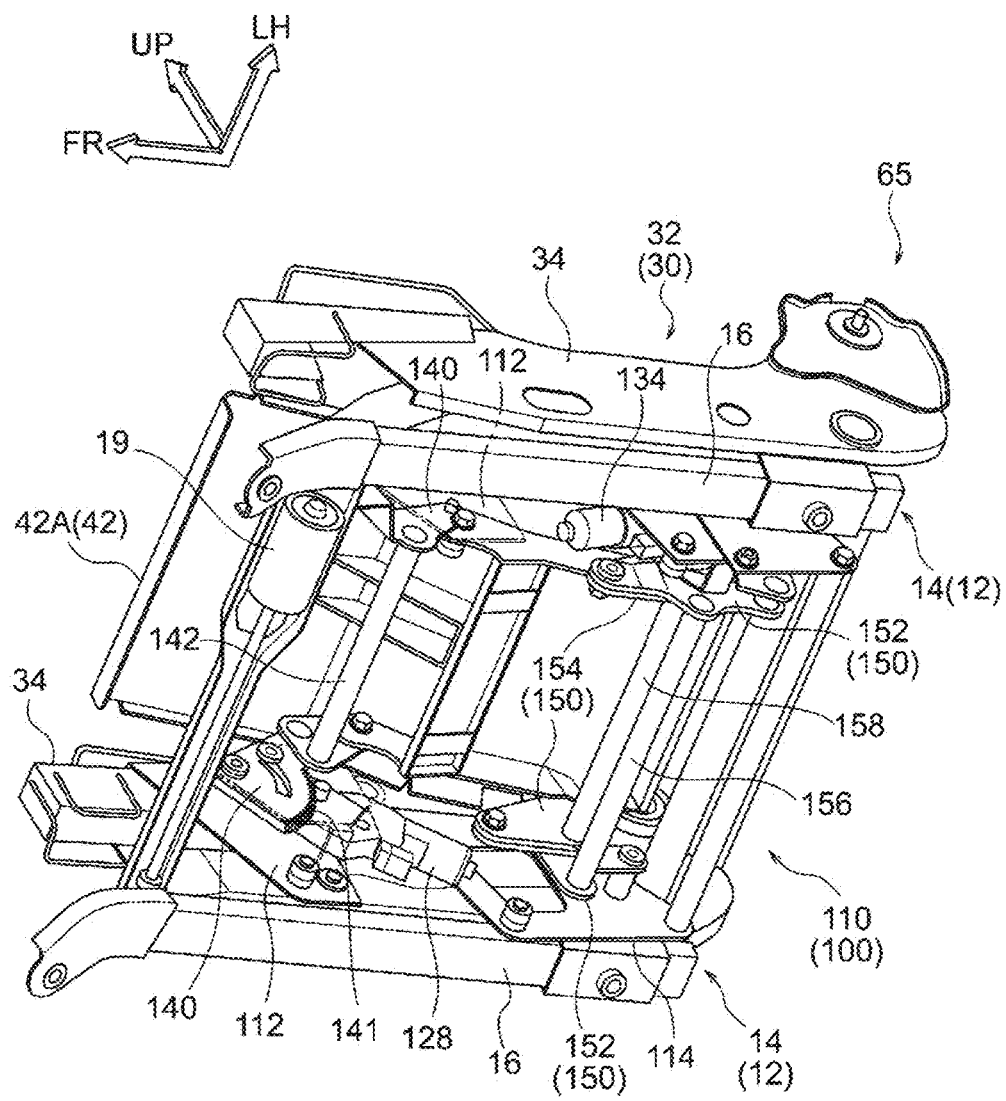
FIG. 5 is a perspective view illustrating a configuration of a cushion frame and a cushion adjustment mechanism of a vehicle seat of the present disclosure.
Figure 7:
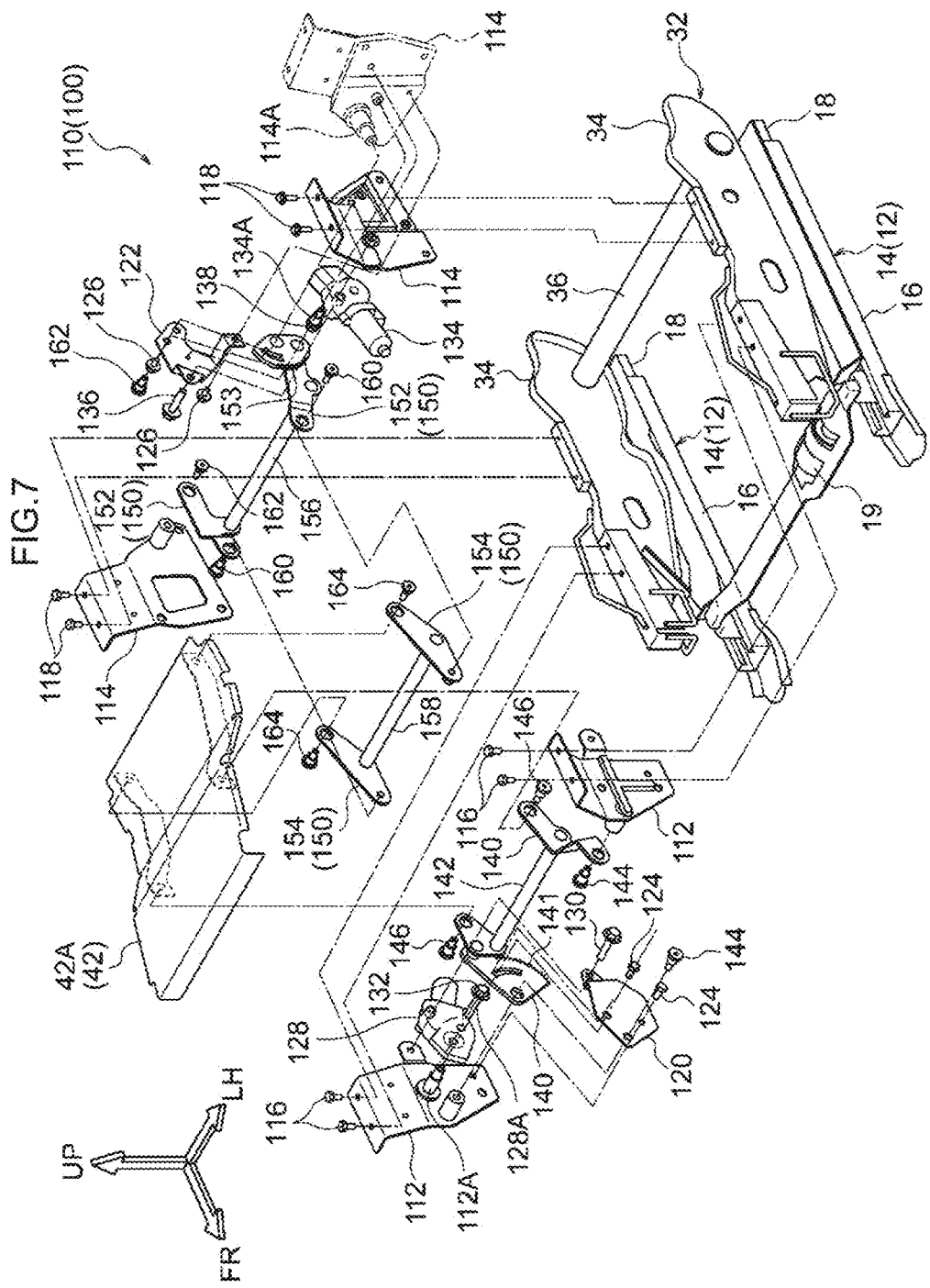
FIG. 7 is an exploded perspective view of a cushion adjustment mechanism.

As illustrated in FIG. 4, FIG. 5, and FIG. 7, the cushion adjustment mechanism 110 includes a pair of left and right front mounting brackets 112, and a pair of left and right rear mounting brackets 114. The front mounting brackets 112 and the rear mounting brackets 114 configure parts common to the cushion frame 32 in the present exemplary embodiment.

The left and right front mounting brackets 112 are disposed at the seat width direction inside of front portions of the left and right side frames 34 of the cushion frame 32. The front mounting brackets 112 are for example, formed by pressing sheet metal, and each is disposed with its plate thickness direction in the seat width direction. An upper end portion of each front mounting bracket 112 is bent toward the seat width direction outside, and is fastened and fixed to an upper end portion of the respective side frame 34 using a pair of bolts 116, and a pair of nuts, not illustrated in the drawings.

The left and right rear mounting brackets 114 are disposed at the seat width direction inside of rear portions of the left and right side frames 34 of the cushion frame 32. The rear mounting brackets 114 are for example, formed by pressing sheet metal, and each is disposed with its plate thickness direction in the seat width direction. An upper end portion of each rear mounting bracket 114 is bent toward the seat width direction outside, and is fastened and fixed to an upper end portion of the respective side frame 34 using a pair of bolts 118, and a pair of nuts, not illustrated in the drawings.

The cushion adjustment mechanism 110 further includes a front gear bracket 120 and a rear gear bracket 122. The front gear bracket 120 is disposed at the seat width direction inside of one of the left and right front mounting brackets 112 (the front mounting bracket 112 on the right side in this example). The front gear bracket 120 is, for example, formed by pressing sheet metal, and is fastened and fixed to the right side front mounting bracket 112 using a pair of bolts 124 and a pair of nuts, not illustrated in the drawings.

A gap is formed between the front gear bracket 120 and the right side front mounting bracket 112.

The rear gear bracket 122 is disposed at the seat width direction inside of one of the left and right rear mounting brackets 114 (the rear mounting bracket 114 on the left side in this example). The rear gear bracket 122 is, for example, formed by pressing sheet metal, and is fastened and fixed to the left side rear mounting bracket 114 using a pair of bolts 126 and a pair of nuts, not illustrated in the drawings. A gap is formed between the rear gear bracket 122 and the left side rear mounting bracket 114.

A cushion up-down adjustment motor 128 configuring the cushion adjustment mechanism 110 is fixed to the right side front mounting bracket 112 using a bolt 130. A pinion 132 is fixed to an output shaft 128A of the cushion up-down adjustment motor 128. A cushion angle adjustment motor 134 configuring the cushion adjustment mechanism 110 is fixed to the left side rear mounting bracket 114 using a bolt 136. A pinion 138 is fixed to an output shaft 134A of the cushion angle adjustment motor 134.

The cushion adjustment mechanism 110 further includes a pair of left and right front links (single links) 140, and a pair of left and right rear links (double links) 150. The left and right front links 140 are disposed at the seat width direction inside of the left and right front mounting brackets 112, and are inclined toward the seat upper side on progression toward the seat rear in side view. The front links 140 are coupled together in the seat width direction by a front coupling pipe 142.

One end portion (a front end portion) of each of the left and right front links 140 is rotatably coupled to the respective left or right front mounting bracket 112 using a shoulder bolt 144 with its axial direction running along the seat width direction. Another end portion (a rear end portion) of each of the left and right front links 140 is rotatably coupled to a front-rear direction intermediate portion of the cushion pan 42A using a shoulder bolt 146 with its axial direction running along the seat width direction, and a nut, not illustrated in the drawings.

A front portion of the right side front link 140 is disposed in the gap between the right side front mounting bracket 112 and the front gear bracket 120. The right side front link 140 is formed with a sector gear 141. The sector gear 141 meshes with the pinion 132 described above. Note that the right side front mounting bracket 112 is formed with a circular column shaped stopper 112A to limit the pivot range of the sector gear 141. The stopper 112A projects toward the seat width direction inside. The stopper 112A is inserted into a circular arc shaped through hole formed in the right side front link 140.

The left and right rear links 150 are disposed at the seat rear side of the left and right front links 140, and include a pair of left and right first rear links 152 and a pair of left and right second rear links 154. The left and right first rear links 152 and the left and right second rear links 154 are disposed at the seat width direction inside of the left and right rear mounting brackets 114. The left and right first rear links 152 are inclined toward the seat upper side on progression toward the seat front in side view, and the left and right second rear links 154 are inclined toward the seat upper side on progression toward the seat rear in side view. The left and right first rear links 152 are coupled together in the seat width direction by a first rear coupling pipe 156, and the left and right second rear links 154 are coupled together in the seat width direction by a second rear coupling pipe 158. Moreover, one end portions (front end portions) of the left and right first rear links 152 and the left and right second rear links 154 are rotatably coupled together using a pair of left and right shoulder bolts 160, each with its axial direction running along the seat width direction, and a pair of left and right nuts, not illustrated in the drawings.

Another end portion (a rear end portion) of each first rear link 152 is rotatably coupled to the corresponding rear mounting bracket 114 and the rear gear bracket 122 (if applicable) using a shoulder bolt 162 and a nut, not illustrated in the drawings. Another end portion (a rear end portion) of each second rear link 154 is disposed at the seat upper side of the other end portion of the corresponding first rear link 152, and is rotatably coupled to a rear end portion of the cushion pan 42A using a shoulder bolt 164 and a nut, not illustrated in the drawings. Together, the front links 140 and the second rear links 154 configure a parallel link mechanism.

A rear portion of the left side first rear link 152 is disposed in the gap between the left side rear mounting bracket 114 and rear gear bracket 122. The left side first rear link 152 is formed with a sector gear 153. The sector gear 153 meshes with the pinion 138 described above. Note that the left side rear mounting bracket 114 is formed with a stopper 114A to limit the pivot range of the sector gear 153.

In the cushion adjustment mechanism 110 configured as described above, when the pinion 132 is rotated by drive force of the cushion up-down adjustment motor 128, the right side front link 140 where the pinion 132 is meshed with the sector gear 141 is rotated about the shoulder bolt 144, together with the front coupling pipe 142 and the left side front link 140. When this occurs, the left and right second rear links 154 configuring the parallel link mechanism with the left and right front links 140 are rotated about the shoulder bolts 162 so as to follow the left and right front links 140. The cushion body 42, in which the left and right front links 140 and the left and right second rear links 154 are coupled to the cushion pan 42A, is thereby configured so as to move in the seat up-down direction with respect to the cushion side portions 46.

Figure 9:
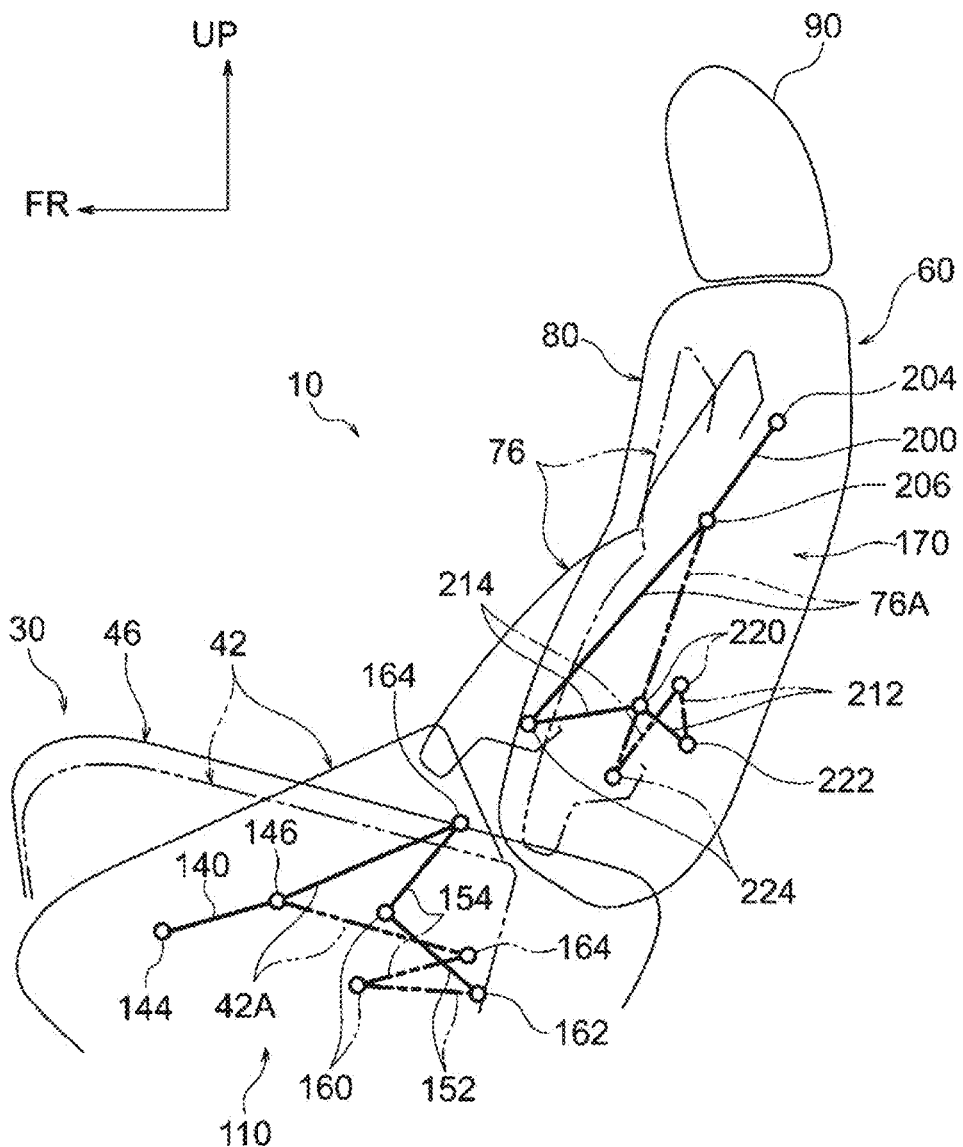
FIG. 9 is a schematic side view of a vehicle seat of the present disclosure, illustrating a state in which a cushion body has been pivoted at a lowermost position and a back body has been pivoted at a rearmost position.
Figure 10:
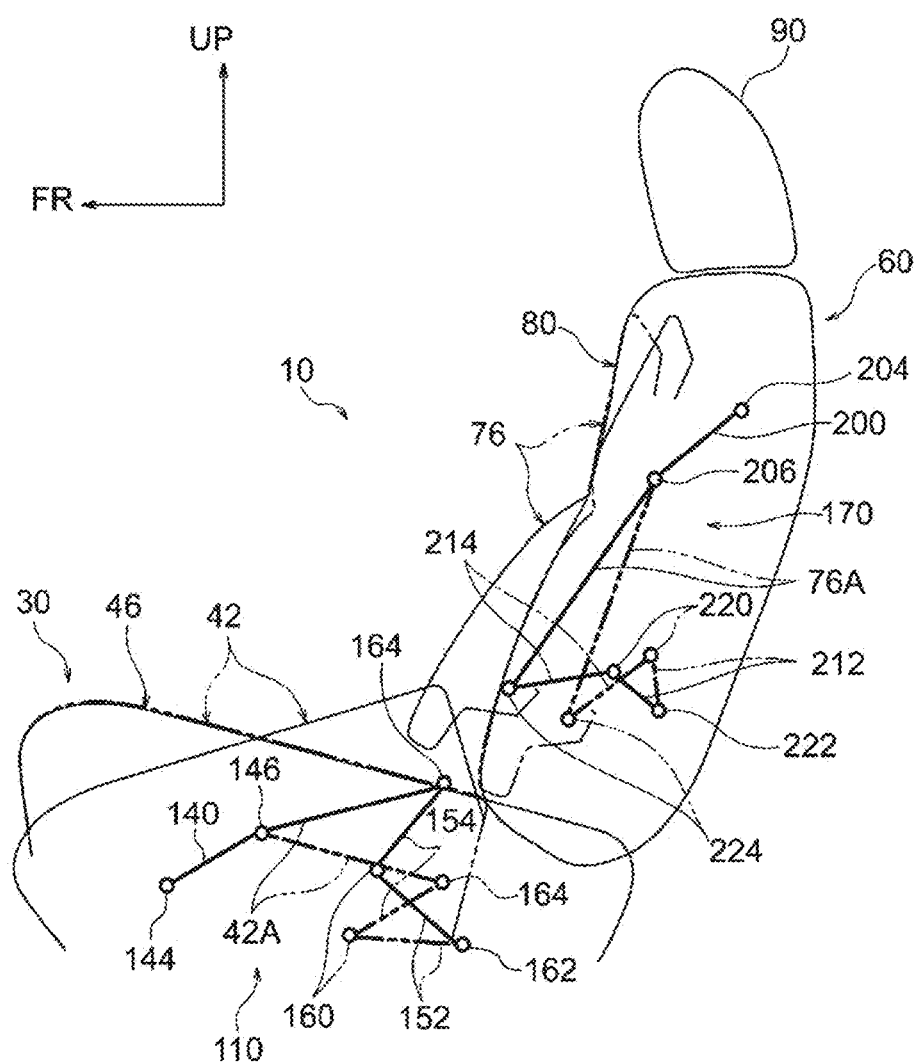
FIG. 10 is a side view corresponding to FIG. 9, illustrating a state in which a cushion body has been pivoted at an up-down baseline position and a back body has been pivoted at a front-rear baseline position.
Figure 11:
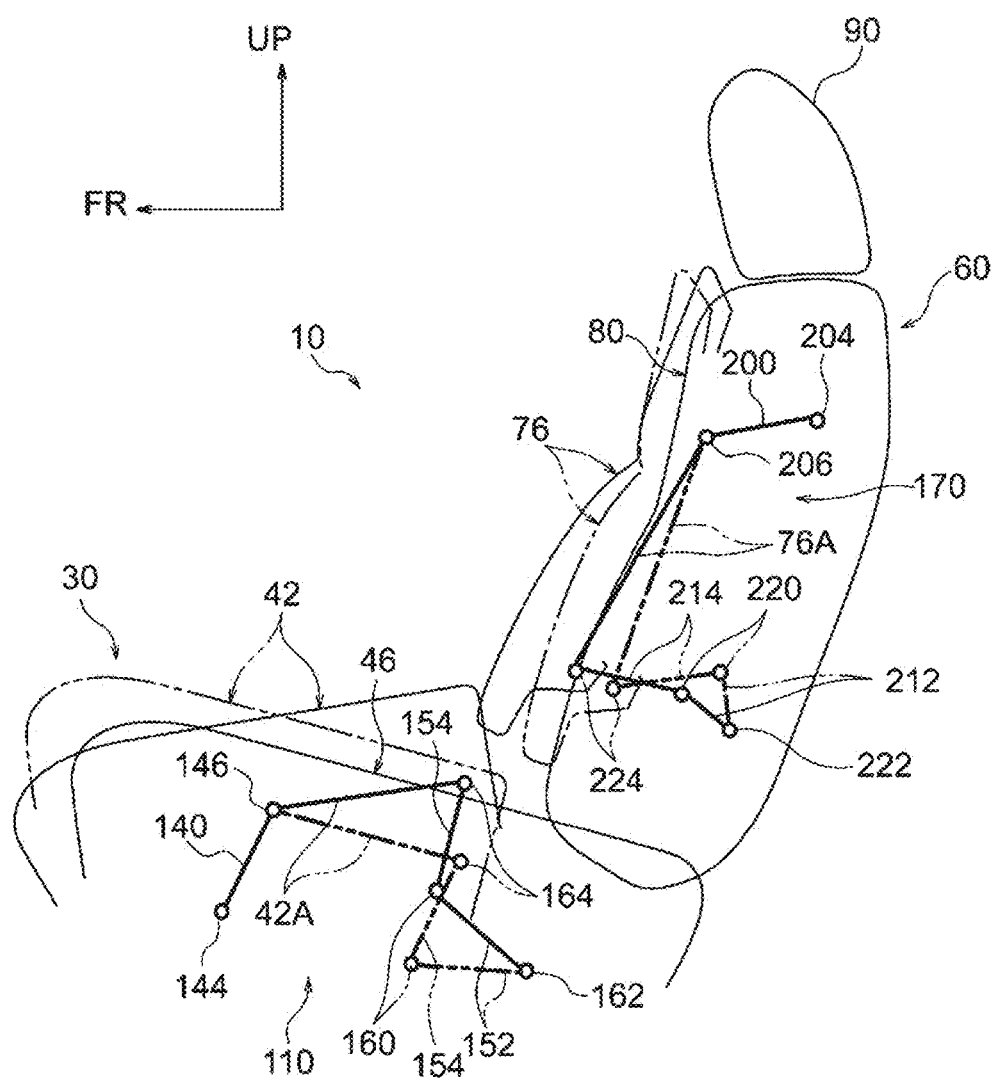
FIG. 11 is a side view corresponding to FIG. 9, illustrating a state in which a cushion body has been pivoted at an uppermost position and a back body has been pivoted at a frontmost position.

Specifically, the cushion body 42 moves in the seat up-down direction between a lowermost position, illustrated by double-dotted dashed lines in FIG. 9, and an uppermost position, illustrated by double-dotted dashed lines in FIG. 11. Note FIG. 10 illustrates a state in which the cushion body 42 is positioned at an up-down intermediate position between the uppermost position and the lowermost position using double-dotted dashed lines. In a state in which the cushion body 42 is positioned at the lowermost position, the cushion body 42 is sunken toward the seat lower side with respect to the cushion outer frame 44, in a configuration in which the lower body of the occupant P (in particular the thigh area) is held from both seat width direction sides by the left and right cushion side portions 46. Moreover, in a state in which the cushion body 42 is positioned at the up-down intermediate position, there is no large step between the cushion body 42 and the cushion side portions 46, in a configuration in which a substantially flat face is formed by an upper face of the cushion body 42 and upper faces of the cushion side portions 46. In a state in which the cushion body 42 is positioned at the uppermost position, configuration is such that the cushion body 42 projects toward the seat upper side of the cushion outer frame 44.

Moreover, in the cushion adjustment mechanism 110, when the pinion 138 is rotated by drive force of the cushion angle adjustment motor 134, the left side first rear link 152 where the pinion 138 is meshed with the sector gear 153 is configured to pivot about the shoulder bolt 162, together with the first rear coupling pipe 156 and the right side first rear link 152. The cushion body 42, in which the left and right first rear links 152 are coupled to the cushion pan 42A through the left and right second rear links 154, is configured so as to pivot about the axis of the shoulder bolts 164 (an axis running along the seat width direction).

Specifically, when the cushion angle adjustment motor 134 is actuated in a state in which the cushion body 42 is positioned at the lowermost position illustrated by double-dotted dashed lines in FIG. 9, the cushion body 42 is configured to be pivoted between the lowermost position and a first forward-tilt position, illustrated by solid lines in FIG. 9. Moreover, when the cushion angle adjustment motor 134 is actuated in a state in which the cushion body 42 is positioned at the up-down intermediate position illustrated by double-dotted dashed lines in FIG. 10, the cushion body 42 is configured to be pivoted between the up-down intermediate position and a second forward-tilt position, illustrated by solid lines in FIG. 10. Moreover, when the cushion angle adjustment motor 134 is actuated in a state in which the cushion body 42 is positioned at the uppermost position illustrated by double-dotted dashed lines in FIG. 11, the cushion body 42 is configured to be pivoted between the uppermost position and a third forward-tilt position, illustrated by solid lines in FIG. 11. Hereafter, "pivoting about the axis of the shoulder bolts 164" is sometimes referred to simply as "pivoting".

Back Adjustment Mechanism 170

As illustrated in FIG. 4, FIG. 6, and FIG. 8, the back adjustment mechanism 170 includes a pair of left and right upper mounting brackets 172, and a pair of left and right lower mounting brackets 174. The upper mounting brackets 172 and the lower mounting brackets 174 configure parts common to the back frame 62 in the present exemplary embodiment.

The left and right upper mounting brackets 172 are disposed at the seat width direction inside of the left and right legs 66A of the upper frame 66 of the back frame 62. The upper mounting brackets 172 are, for example, formed by pressing sheet metal, and are joined to the left and right legs 66A by welding or the like.

The left and right lower mounting brackets 174 are disposed at the seat width direction inside of lower portions of the left and right side frames 64 of the back frame 62. The lower mounting brackets 174 are, for example, formed by pressing sheet metal, and are joined to the left and right side frames 64 by welding or the like.

The back adjustment mechanism 170 further includes an upper gear bracket 176 and a lower gear bracket 178. The upper gear bracket 176 is disposed at the seat width direction inside of one of the left and right upper mounting brackets 172 (the left side upper mounting bracket 172 in this example). The upper gear bracket 176 is, for example, formed by pressing sheet metal, and is fastened and fixed to the left side upper mounting bracket 172 using a pair of nuts 180 and a pair of bolts, not illustrated in the drawings. A gap is formed between the upper gear bracket 176 and the left side upper mounting bracket 172.

The lower gear bracket 178 is disposed at the seat width direction inside of one of the left and right lower mounting brackets 174 (the left side lower mounting bracket 174 in this example). The lower gear bracket 178 is, for example, formed by pressing sheet metal, and is fastened and fixed to the left side lower mounting bracket 174 using a pair of bolts 182 and a pair of nuts, not illustrated in the drawings. A gap is formed between the lower gear bracket 178 and the left side lower mounting bracket 174.

A back front-rear adjustment motor 184 configuring the back adjustment mechanism 170 is fixed to the left side upper mounting bracket 172 using a bolt 186. A pinion 188 is fixed to an output shaft 184A of the back front-rear adjustment motor 184. Moreover, a back angle adjustment motor 190 configuring the back adjustment mechanism 170 is fixed to the left side lower mounting bracket 174 using a bolt 192. A pinion 194 is fixed to an output shaft 190A of the back angle adjustment motor 190.

The back adjustment mechanism 170 further includes a pair of left and right upper links (single links) 200 and a pair of left and right lower links (double links) 210. The left and right upper links 200 are disposed at the seat width direction inside of the left and right upper mounting brackets 172, and are inclined toward the seat front on progression toward the seat lower side in side view. The upper links 200 are coupled together in the seat width direction by an upper coupling pipe 202.

One end portion (an upper end portion) of each of the left and right upper links 200 is rotatably coupled to the respective left or right upper mounting bracket 172 using a shoulder bolt 204 with its axial direction running along the seat width direction. Another end portion (a lower end portion) of each of the left and right upper links 200 is rotatably coupled to an upper portion of the back pan 76A using a shoulder bolt 206 with its axial direction running along the seat width direction, and a nut 208.

A front portion of the left side upper link 200 is disposed in the gap between the left side upper mounting bracket 172 and the upper gear bracket 176. The left side upper link 200 is formed with a sector gear 201. The sector gear 201 is meshed with the pinion 188 described above. Note that a bolt 181 illustrated in FIG. 8 acts as a stopper to limit the pivot range of the sector gear 201. The bolt 181 penetrates a through hole formed in the upper gear bracket 176 and a circular arc shaped through hole formed in the sector gear 201, and is screwed together with a nut, not illustrated in the drawings, fixed to the left side upper mounting bracket 172.

The left and right lower links 210 are disposed at the seat lower side of the left and right upper links 200, and include a pair of left and right first lower links 212 and a pair of left and right second lower links 214. The left and right first lower links 212 and the left and right second lower links 214 are disposed at the seat width direction inside of the left and right lower mounting brackets 174. The left and right first lower links 212 are inclined toward the seat upper side on progression toward the seat front in side view, and the left and right second lower links 214 are inclined toward the seat lower side on progression toward the seat front in side view. The left and right first lower links 212 are coupled together in the seat width direction by a first lower coupling pipe 216, and the left and right second lower links 214 are coupled together in the seat width direction by a second lower coupling pipe 218. Moreover, one end portions (upper end portions) of the left and right first lower links 212 and the left and right second lower links 214 are rotatably coupled together using a shoulder bolt 220 with its axial direction running along the seat width direction, and a nut, not illustrated in the drawings.

Another end portion (a lower end portion) of each first lower link 212 is rotatably coupled to the corresponding lower mounting bracket 174 and the lower gear bracket 178 (if applicable) using a shoulder bolt 222 and a nut, not illustrated in the drawings. Another end portion (a lower end portion) of each second lower link 214 is disposed at the seat front of the other end portion of the corresponding first lower link 212, and is rotatably coupled to a lower portion of the back pan 76A using a shoulder bolt 224 and a nut 226. Together, the second lower links 214 and the upper links 200 configure a parallel link mechanism.

The left side first lower link 212 includes a sector gear 213 disposed in the gap between the left side lower mounting bracket 174 and the lower gear bracket 178. The sector gear 213 is meshed with the pinion 194 described above. Note that the left side lower mounting bracket 174 is formed with a circular column shaped stopper, not illustrated in the drawings, to limit the pivot range of the sector gear 213. The stopper is inserted into a circular arc shaped through hole formed in the sector gear 213.

In the back adjustment mechanism 170 configured as described above, when the pinion 188 is rotated by drive force of the back front-rear adjustment motor 184, the left side upper link 200 where the pinion 188 is meshed with the sector gear 201 is rotated about the shoulder bolt 204, together with the front coupling pipe 202 and the right side upper link 200. When this occurs, the left and right second lower links 214 configuring the parallel link mechanism with the left and right upper links 200 are rotated about the shoulder bolts 220 so as to follow the left and right upper links 200. The back body 76, in which the left and right upper links 200 and the left and right second lower links 214 are coupled to the back pan 76A, is thereby configured so as to move in the seat front-rear direction with respect to the back side portions 80.

Specifically, the back body 76 moves in the seat front-rear direction between a rearmost position illustrated by double-dotted dashed lines in FIG. 9, and a frontmost position illustrated by double-dotted dashed lines in FIG. 11. Note that FIG. 10 illustrates a state in which the back body 76 is positioned at a front-rear intermediate position between the frontmost position and the rearmost position using double-dotted dashed lines. In a state in which the back body 76 is positioned at the rearmost position, the back body 76 is sunken toward the seat rear side with respect to the back outer frame 78, in a configuration in which the upper body of the occupant P (in particular the sides of their abdomen) is held from both seat width direction sides by the left and right back side portions 80. Moreover, in a state in which the back body 76 is positioned at the front-rear intermediate position, there is no large step between the back body 76 and the back side portions 80, in a configuration in which a substantially flat face is formed by a front face of the back body 76 and front faces of the back side portions 80. In a state in which the back body 76 is positioned at the frontmost position, configuration is such that in the back body 76 projects toward the seat front with respect to the back outer frame 78.

Moreover, in the back adjustment mechanism 170, when the pinion 194 is rotated by drive force of the back angle adjustment motor 190, the left side first lower link 212 where the pinion 194 is meshed with the sector gear 213 pivots about the shoulder bolt 222 together with the first lower coupling pipe 216 and the right side first lower link 212. Accordingly, the back body 76, in which the left and right first lower links 212 are coupled to the back pan 76A through the left and right second lower links 214, is configured so as to pivot about the axis of the shoulder bolts 206 (an axis running along the seat width direction).

Specifically, when the back angle adjustment motor 190 is actuated in a state in which the back body 76 is positioned at the rearmost position illustrated by double-dotted dashed lines in FIG. 9, the back body 76 is configured to be pivoted between the rearmost position and a first tilt position, illustrated by solid lines in FIG. 9. Moreover, when the back angle adjustment motor 190 is actuated in a state in which the back body 76 is positioned at the front-rear intermediate position illustrated by double-dotted dashed lines in FIG. 10, the back body 76 is configured to be pivoted between the front-rear intermediate position and a second tilt position, illustrated by solid lines in FIG. 10. Moreover, when the back angle adjustment motor 190 is actuated in a state in which the back body 76 is positioned at the frontmost position illustrated by double-dotted dashed lines in FIG. 11, the back body 76 is configured to be pivoted between the frontmost position and a third tilt position illustrated by solid lines in FIG. 11. Hereafter, "pivoting about the axis of the shoulder bolts 206" is sometimes referred to simply as "pivoting".

ECU 230

Figure 12:
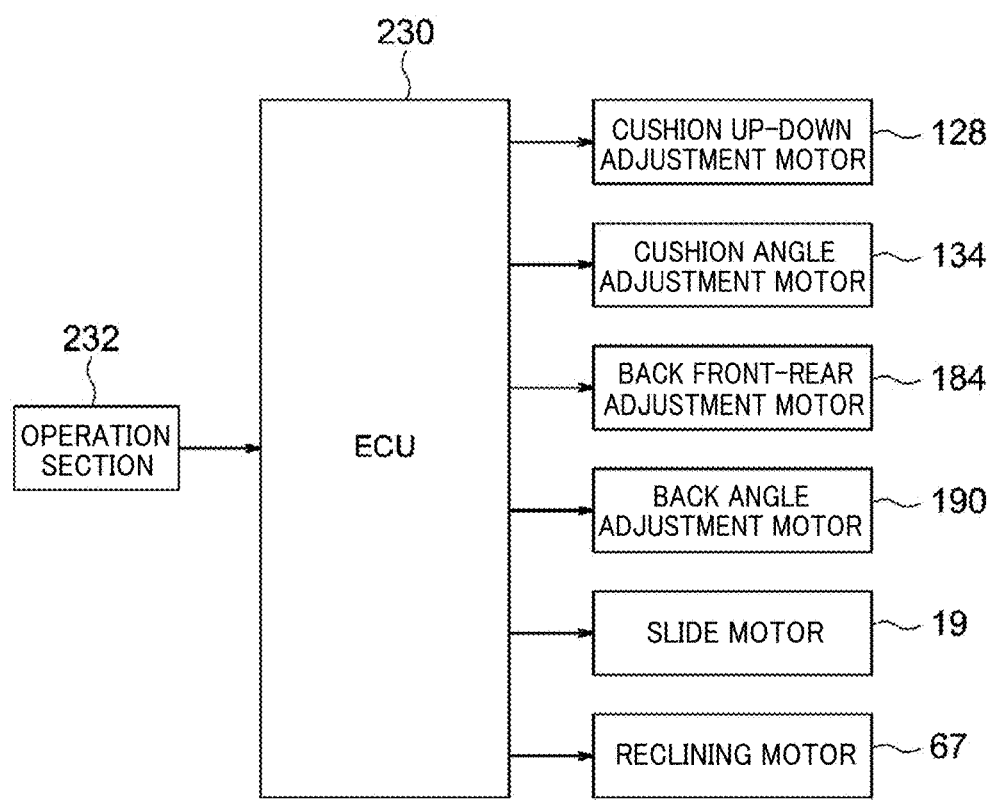
FIG. 12 is a block diagram illustrating a control system of a vehicle seat of the present disclosure.

The ECU 230 (Electronic Control Unit) illustrated in FIG. 12 is configured by a microcomputer in which a CPU, ROM, RAM, and an input/output interface (I/O) are connected to a bus. The slide motor 19 described above, the reclining motor 67, a lifter motor included in a lifter mechanism, not illustrated in the drawings, the cushion up-down adjustment motor 128, the cushion angle adjustment motor 134, the back front-rear adjustment motor 184, and the back angle adjustment motor 190 are electrically connected to the I/O of the ECU 230. Moreover, an operation section 232 provided to a side face of the seat cushion 30, for example, is also electrically connected to the I/O of the ECU 230.

The operation section 232 described above is provided with switches to drive the slide motor 19, the reclining motor 67, and the lifter motor, as well as a mode selection switch. The mode selection switch is a switch to select a desired mode out of plural (various) modes pre-stored in the ROM of the ECU 230. The ECU 230 is configured to control drive of the reclining motor 67, the cushion up-down adjustment motor 128, the cushion angle adjustment motor 134, the back front-rear adjustment motor 184, and the back angle adjustment motor 190 according to the mode selected using the mode selection switch.

Figure 13:
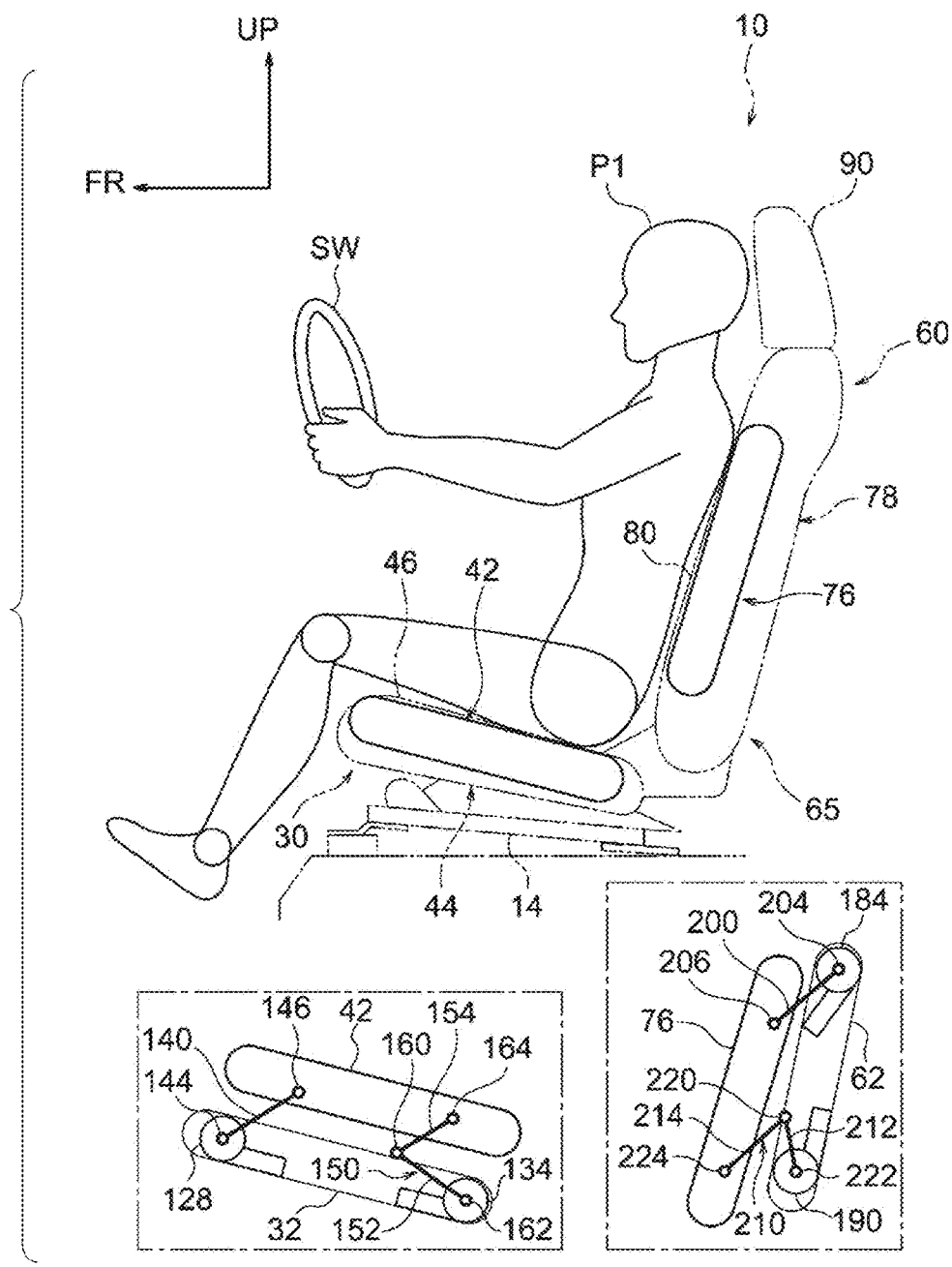
FIG. 13 is a schematic side view illustrating a state in which a vehicle seat of the present disclosure is in a manual driving mode.
Figure 14:
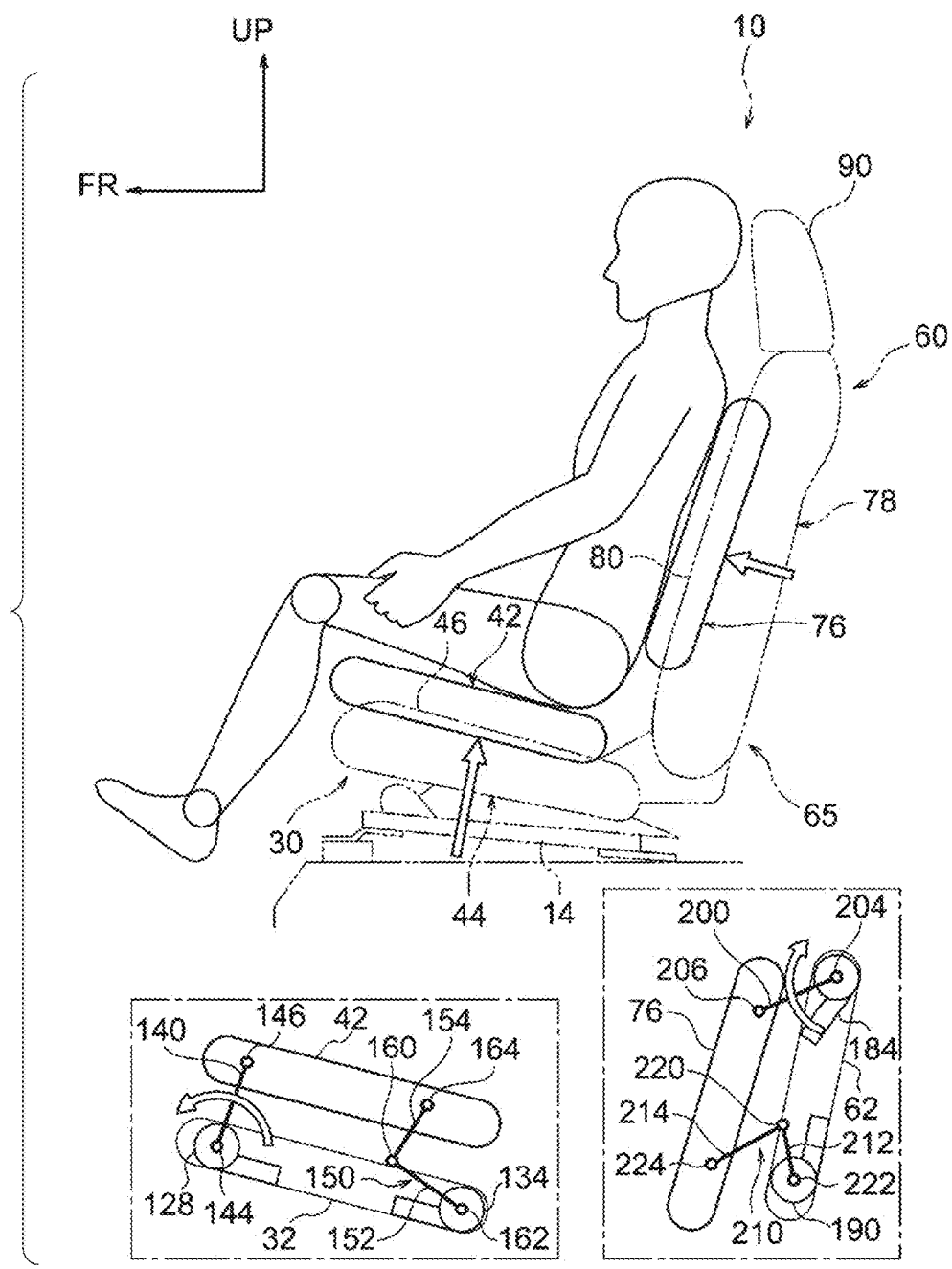
FIG. 14 is a schematic side view illustrating a state in which a vehicle seat of the present disclosure is in a flat sofa mode.
Figure 15:
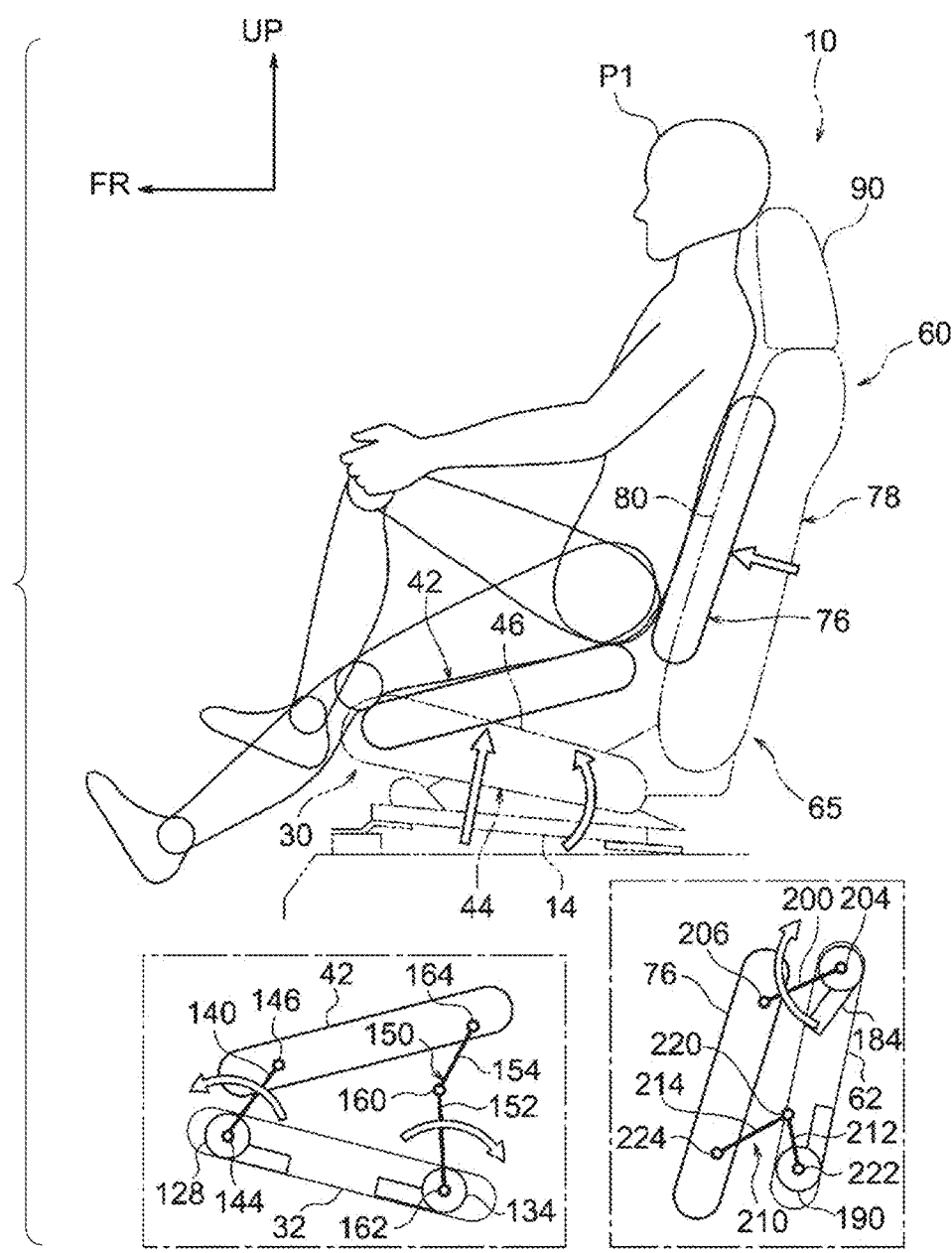
FIG. 15 is a schematic side view illustrating a state in which a vehicle seat of the present disclosure is in a leg-only stretch mode.
Figure 16:
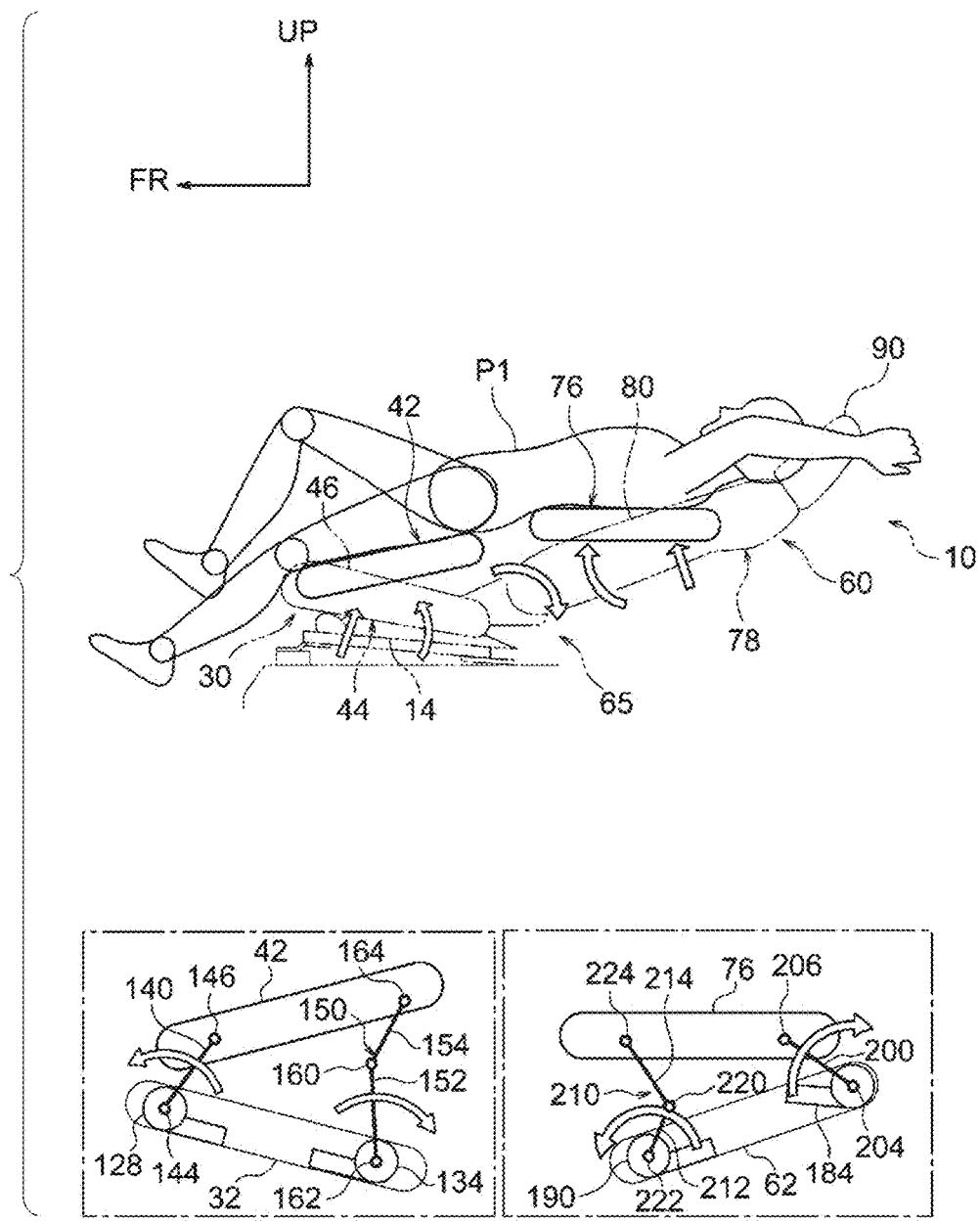
FIG. 16 is a schematic side view illustrating a state in which a vehicle seat of the present disclosure is in a full-body stretch mode.
Figure 17:
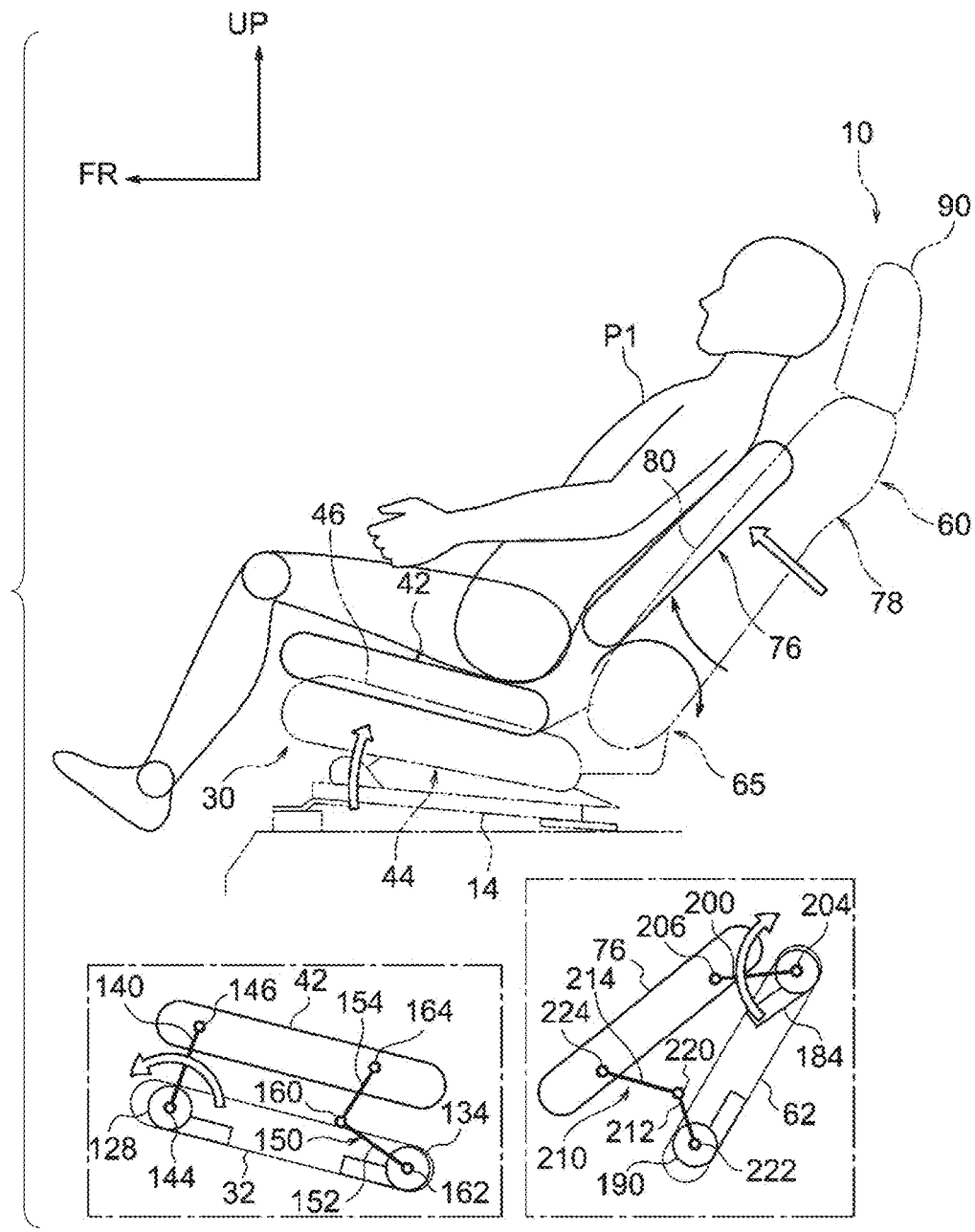
FIG. 17 is a schematic side view illustrating a state in which a vehicle seat of the present disclosure is in a back-only stretch mode.
Figure 18:
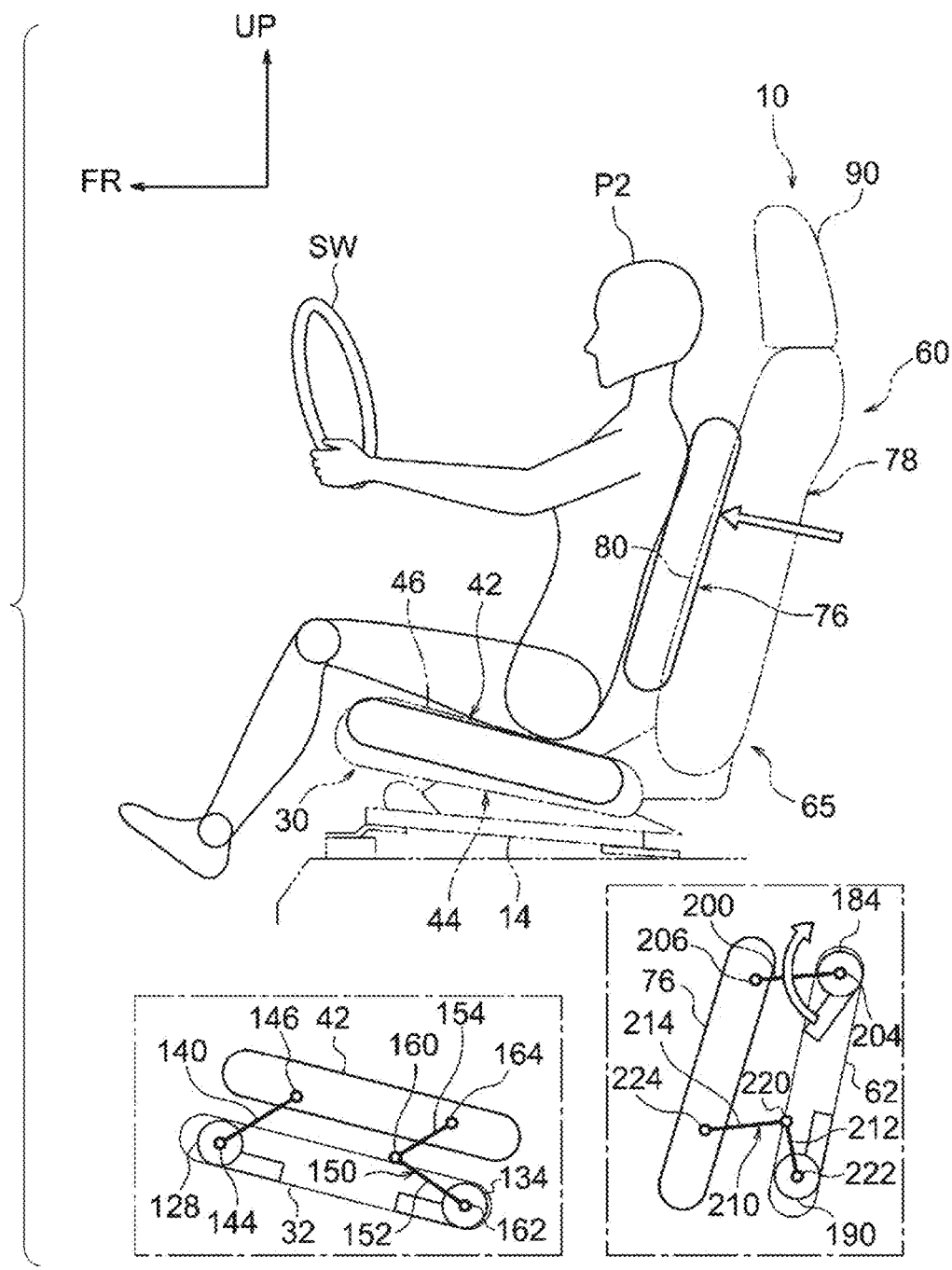
FIG. 18 is a schematic side view illustrating a state in which a vehicle seat of the present disclosure is in a small-build female driver mode.
Figure 19:
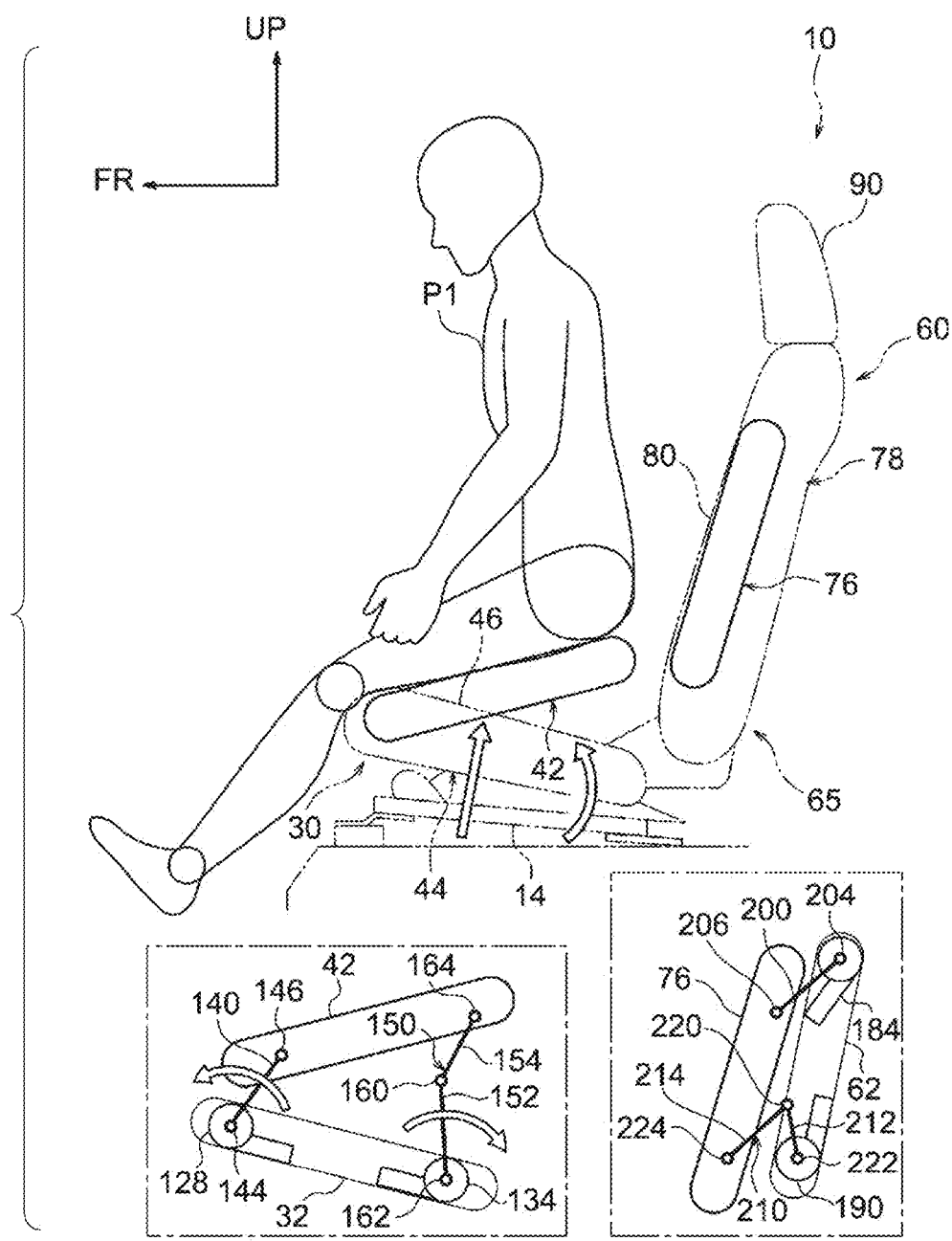
FIG. 19 is a schematic side view illustrating a state in which a vehicle seat of the present disclosure is in an embarkation/disembarkation mode.
Figure 20:
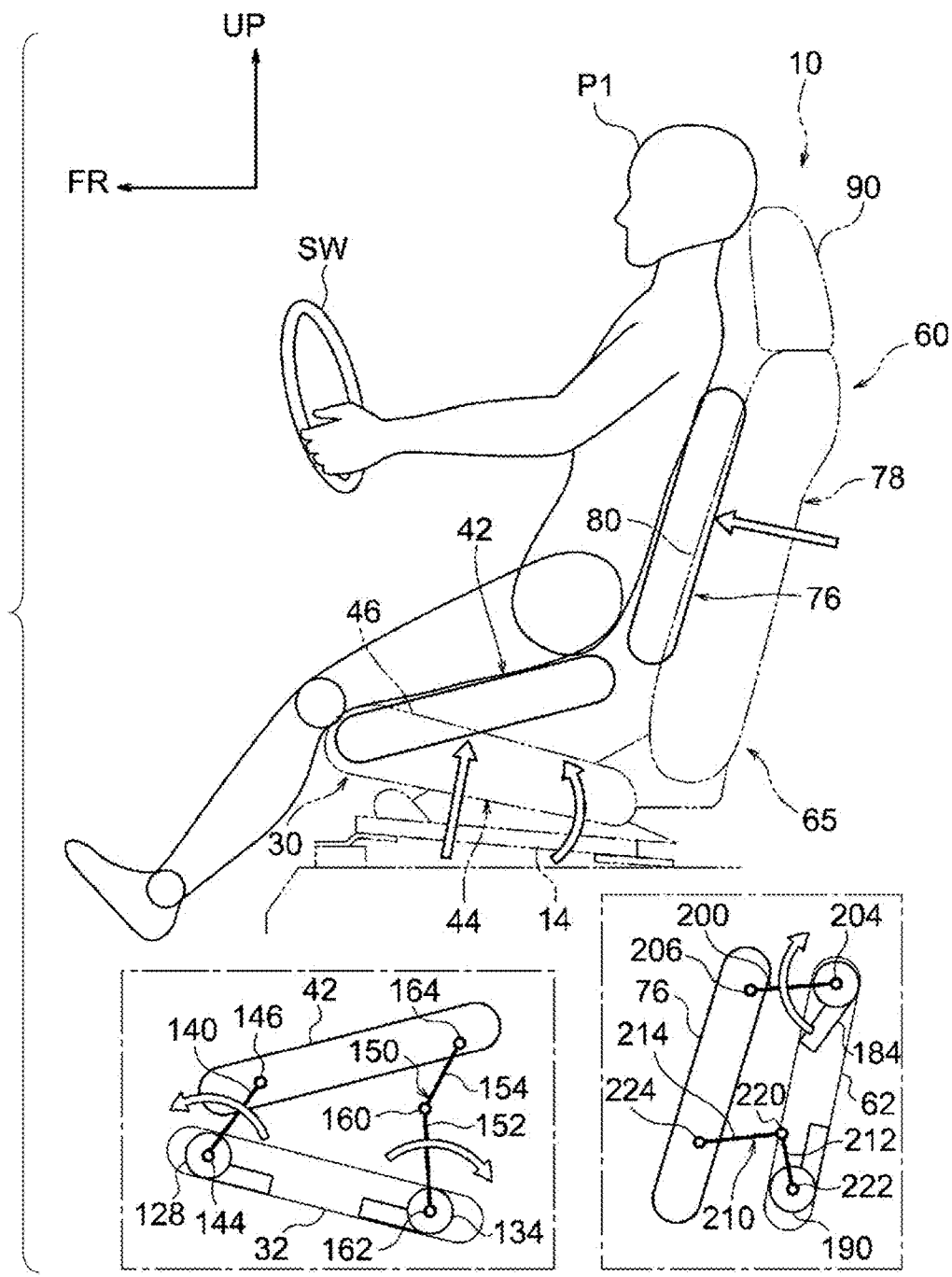
FIG. 20 is a schematic side view illustrating a state in which a vehicle seat of the present disclosure is in a semi-standing drive mode.
Figure 21:
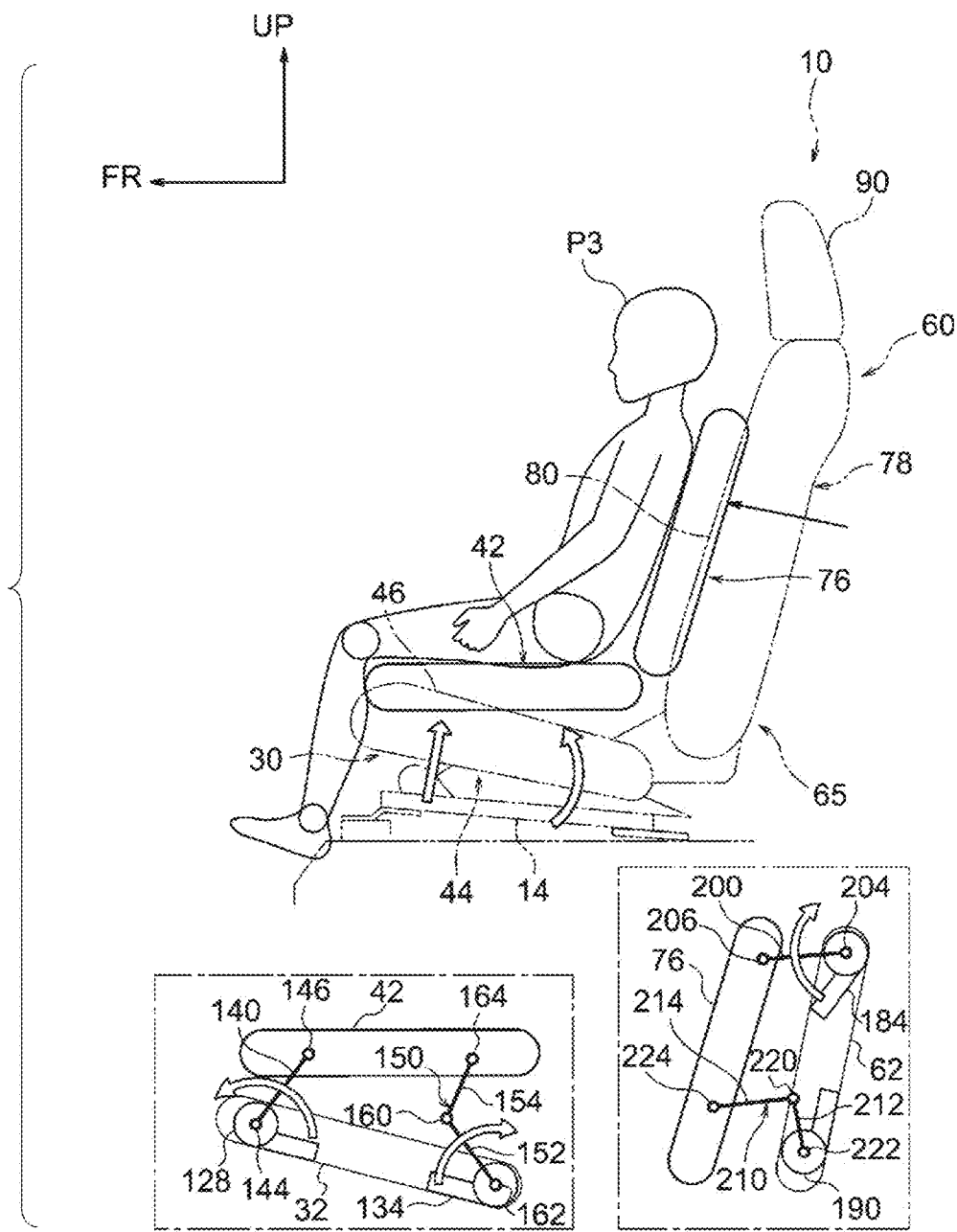
FIG. 21 is a schematic side view illustrating a state in which a vehicle seat of the present disclosure is in a junior seat mode.

The plural modes above include a manual driving mode illustrated in FIG. 13, a flat sofa mode illustrated in FIG. 14, a leg-only stretch mode illustrated in FIG. 15, a full-body stretch mode illustrated in FIG. 16, a back-only stretch mode (bent-at-midriff mode) illustrated in FIG. 17, a small-build female driver mode illustrated in FIG. 18, an embarkation/disembarkation mode illustrated in FIG. 19, a semi-standing drive mode illustrated in FIG. 20, and a junior seat mode illustrated in FIG. 21. Note that in FIG. 13 to FIG. 21, the regions surrounded by single-dotted dashed lines schematically illustrate states of the front links 140, the rear links 150, the upper links 200, and the lower links 210 corresponding to each of the illustrated modes. Moreover, in FIG. 13, FIG. 14, FIG. 18, and FIG. 20, SW indicates the steering wheel of the vehicle. The modes illustrated in FIG. 13, FIG. 18, and FIG. 20 in which the steering wheel SW is illustrated are modes appropriate for a driving seat, whereas the modes illustrated in FIG. 14 to FIG. 16, FIG. 19, and FIG. 21 in which the steering wheel SW is not illustrated are modes appropriate for the driving seat during automatic driving, or for seats other than the driving seat.

The manual driving mode illustrated in FIG. 13 corresponds to a "baseline mode" of the present disclosure. The vehicle seat 10 is normally in a state corresponding to the manual driving mode. In the manual driving mode, a reclining angle of the seatback 60, namely an incline angle of the seatback 60 toward the seat rear side with respect to a vertical direction in the vehicle, is, for example, set to 21°. In the manual driving mode, the cushion body 42 is disposed at the lowermost position (up-down baseline position), and the back body 76 is disposed at the rearmost position (front-rear baseline position).

When a mode other than the manual driving mode has been selected from the plural modes described above, in cases in which either one or both out of the cushion adjustment mechanism 110 and the back adjustment mechanism 170 is not in the manual driving mode state, the ECU 230 actuates the one or both of the cushion adjustment mechanism 110 and the back adjustment mechanism 170 so as to adopt the manual driving mode state, before actuating one or both of the cushion adjustment mechanism 110 and the back adjustment mechanism 170 so as to adopt the selected mode state. Explanation follows regarding control by the ECU 230 in a case in which the mode selection switch has been used to select another mode when in the manual driving mode state.

In cases in which the flat sofa mode illustrated in FIG. 14 has been selected, the ECU 230 drives the cushion up-down adjustment motor 128 and the back front-rear adjustment motor 184. The ECU 230 thereby actuates the cushion adjustment mechanism 110 and the back adjustment mechanism 170. When this is performed, the reclining angle of the seatback 60 is set to the same angle as in the manual driving mode (for example 21°). The cushion body 42 is moved by, for example, 30 mm toward the seat upper side from the lowermost position. The back body 76 is moved by, for example, 30 mm toward the seat front from the rearmost position, maintaining a posture parallel to the torso line of the occupant P. The hold on the occupant P by the vehicle seat 10 is thereby relaxed. Accordingly, when the flat sofa mode is selected during automatic driving of the vehicle, the occupant P is placed in a state allowing them to move their body more easily. Note that the flat sofa mode may be configured as the "baseline mode" of the present disclosure.

In cases in which the leg-only stretch mode illustrated in FIG. 15 has been selected, the ECU 230 drives the cushion up-down adjustment motor 128, the cushion angle adjustment motor 134, and the back front-rear adjustment motor 184. The ECU 230 thereby actuates the cushion adjustment mechanism 110 and the back adjustment mechanism 170. When this is performed, the reclining angle of the seatback 60 is set to the same angle as in the manual driving mode (for example 21°). Moreover, the cushion body 42 is tilted downward toward the vehicle front side such that the incline angle of the cushion body 42 with respect to a horizontal direction in the vehicle becomes, for example, 15°. The back body 76 is moved to the same position as that in the flat sofa mode. This enables the occupant P to extend and stretch their legs.

In cases in which the full-body stretch mode illustrated in FIG. 16 has been selected, the ECU 230 drives the reclining motor 67, the cushion up-down adjustment motor 128, the cushion angle adjustment motor 134, the back front-rear adjustment motor 184, and the back angle adjustment motor 190. The ECU 230 thereby actuates the reclining mechanism 65, the cushion adjustment mechanism 110, and the back adjustment mechanism 170. When this is performed, the reclining angle of the seatback 60 is set to, for example, 60°. Moreover, the cushion body 42 is tilted downward toward the vehicle front side such that the incline angle of the cushion body 42 with respect to a horizontal direction in the vehicle becomes, for example, 15°. The back body 76 is moved from its position when in the flat sofa mode to a position pivoted toward the front side of the seatback 60 about the shoulder bolts 206. When this is performed, the angle by which the back body 76 pivots is, for example, 15°. This enables the occupant P to extend and stretch their entire body.

In cases in which the back-only stretch mode illustrated in FIG. 17 has been selected, the ECU 230 drives the reclining motor 67, the cushion up-down adjustment motor 128, the back front-rear adjustment motor 184, and the back angle adjustment motor 190. The ECU 230 thereby actuates the reclining mechanism 65, the cushion adjustment mechanism 110, and the back adjustment mechanism 170. When this is performed, the reclining angle of the seatback 60 is set to, for example, 45°. Moreover, the cushion body 42 is moved toward its position when in the flat sofa mode. The back body 76 is moved from its position when in the flat sofa mode position to a position pivoted toward the front side of the seatback 60 about the shoulder bolts 206. When this is performed, angle by which the back body 76 pivots is, for example, 15°. This enables the occupant P to extend and stretch their back.

In cases in which the small-build female driver mode illustrated in FIG. 18 has been selected, the ECU 230 drives the back front-rear adjustment motor 184. The ECU 230 thereby actuates the back adjustment mechanism 170. When this is performed, the reclining angle of the seatback 60 is set to the same angle as in the manual driving mode. The cushion body 42 is also at its position when in the manual driving mode. The back body 76 is moved by, for example, 70 mm to the seat front of the rearmost position, while maintaining a posture parallel to the torso line of the occupant P. This achieves a state which facilitates driving of the vehicle by a female occupant P2 of small build.

In cases in which the embarkation/disembarkation mode illustrated in FIG. 19 has been selected, the ECU 230 drives the cushion up-down adjustment motor 128 and the cushion angle adjustment motor 134. The ECU 230 thereby actuates the cushion adjustment mechanism 110. When this is performed, the reclining angle of the seatback 60 is set to the same angle as in the manual driving mode. Moreover, the cushion body 42 is tilted downward toward the vehicle front side such that the incline angle of the cushion body 42 with respect to a horizontal direction in the vehicle becomes, for example, 15°. The back body 76 is maintained at its position when in the manual driving mode. This achieves a state which facilitates embarkation/disembarkation of the vehicle by the occupant P.

In cases in which the semi-standing drive mode illustrated in FIG. 20 has been selected, the ECU 230 drives the cushion up-down adjustment motor 128, the cushion angle adjustment motor 134, and the back front-rear adjustment motor 184. The ECU 230 thereby actuates the cushion adjustment mechanism 110 and the back adjustment mechanism 170. When this is performed, the reclining angle of the seatback 60 is set to the same angle as in the manual driving mode. Moreover, the cushion body 42 is moved to its highest possible position, driven by the cushion up-down adjustment motor 128 and the cushion angle adjustment motor 134. The back body 76 is moved by, for example, 70 mm to the seat front of the rearmost position while maintaining a posture parallel to the torso line of the occupant P. This enables the occupant P to drive in a semi-standing state. Note that the semi-standing drive mode is selected during automatic driving of the vehicle, in which the occupant P only operates the steering wheel.

In cases in which the junior seat mode illustrated in FIG. 21 has been selected, the ECU 230 drives the cushion up-down adjustment motor 128, the cushion angle adjustment motor 134, and the back front-rear adjustment motor 184. The ECU 230 thereby actuates the cushion adjustment mechanism 110 and the back adjustment mechanism 170. When this is performed, the reclining angle of the seatback 60 is set to the same angle as in the manual driving mode. Moreover, the cushion body 42 is moved by, for example, 70 mm in the seat upward direction, and is oriented horizontally with respect to the vehicle. Moreover, the back body 76 is moved by, for example, 70 mm to the seat front of the rearmost position, while maintaining a posture parallel to the torso line of the occupant P. This achieves a state that makes it easier for a child occupant P3 to sit on the vehicle seat 10.

Note that the ECU 230 is configured to move the cushion body 42 in the seat upward direction and then pivot the cushion body 42 in cases in which the cushion body 42 is both moved in the seat upward direction and pivoted by the cushion adjustment mechanism 110 (when opening out the cushion body 42). Moreover, the ECU 230 is configured to pivot the cushion body 42 and then move the cushion body 42 in the seat downward direction in cases in which the cushion body 42 is both moved in the seat downward direction and pivoted by the cushion adjustment mechanism 110 (when taking in the cushion body 42). Moreover, the ECU 230 is configured to move the back body 76 in the seat front direction and then pivot the back body 76 in cases in which the back body 76 is both moved in the seat front direction and pivoted by the back adjustment mechanism 170 (when opening out the back body 76). Moreover, the ECU 230 is configured to pivot the back body 76 and then move the back body 76 in the seat rear direction in cases in which the back body 76 is both moved in the seat rear direction and pivoted by the back adjustment mechanism 170 (when taking in the back body 76).

Moreover, when there has been a request to actuate the reclining mechanism 65 (namely, when the switch that drives the reclining motor 67 has been operated), in cases in which either one or both of the cushion adjustment mechanism 110 and the back adjustment mechanism 170 is not in the manual driving mode (baseline mode), the ECU 230 is configured to actuate the one or both of the cushion adjustment mechanism 110 and the back adjustment mechanism 170 so as to adopt the manual driving mode state before driving the reclining motor 67.

Operation and Advantageous Effects

Next, explanation follows regarding operation and advantageous effects of the present exemplary embodiment.

In the vehicle seat 10 configured as described above, the buttocks of the occupant P are supported by the cushion body 42 of the seat cushion 30, and the back of the occupant P is supported by the back body 76 of the seatback 60. The cushion side portions 46 are disposed at both seat width direction sides of the cushion body 42, and the back side portions 80 are disposed on both seat width direction sides of the back body 76.

The vehicle seat 10 is provided with the adjustment mechanism 100 that includes the cushion adjustment mechanism 110 and the back adjustment mechanism 170. When actuated, the cushion adjustment mechanism 110 moves the cushion body 42 in the seat up-down direction with respect to the cushion side portions 46, and also pivots the cushion body 42 about an axis running along the seat width direction. Accordingly, it is possible to change not only the up-down position of the cushion body 42, but also the incline angle of the cushion body 42, with respect to the cushion side portions 46. Moreover, when actuated, the back adjustment mechanism 170 moves the back body 76 in the seat front-rear direction with respect to the back side portions 80 and pivots the back body 76 about an axis running along the seat width direction. Accordingly, it is possible to change not only the front-rear position of the back body 76, but also the incline angle of the back body 76 with respect to the back side portions 80. The present exemplary embodiment is thereby capable of adjusting between a wide range of seating postures of the occupant P.

Specifically, the seat cushion 30 and the seatback 60 can be placed in states such as the manual driving mode, the flat sofa mode, the leg-only stretch mode, the full-body stretch mode, the back-only stretch mode, the small-build female driver mode, the embarkation/disembarkation mode, the semi-standing drive mode, and the junior seat mode described above. This thereby enables various seating postures of the occupant P to be adopted in an automatically driven vehicle or the like. Moreover, the various stretch modes facilitate in-vehicle stretching and exercising by the occupant P, thereby enabling lower-leg swelling and general fatigue to be reduced when driving for extended periods or riding in the vehicle for extended periods.

Moreover, in the present exemplary embodiment, the cushion adjustment mechanism 110 is provided with the front links 140 and the rear links 150 including the first rear links 152 and the second rear links 154. The front links 140 and the second rear links 154 configure a parallel link mechanism in the cushion adjustment mechanism 110. This thereby enables the cushion body 42 to be moved in the seat up-down direction with respect to the cushion side portions 46. Moreover, when the first rear links 152 are rotated with respect to the cushion frame 32 and the second rear links 154, the cushion body 42 is pivoted about the axis of the shoulder bolts 146 (axis running along the seat width direction), these being coupling portions with the front links 140. Configuring the cushion adjustment mechanism 110 employing the links to move the cushion body 42 in the seat up-down direction with respect to the cushion side portions 46 and pivot the cushion body 42 about an axis running along the seat width direction enables a simple configuration to be achieved for the cushion adjustment mechanism 110.

Similarly, the back adjustment mechanism 170 is provided with the upper links 200 and the lower links 210 including the first lower links 212 and the second lower links 214. The upper links 200 and the second lower links 214 configure a parallel link mechanism in the back adjustment mechanism 170. This thereby enables the back body 76 to be moved in the seat front-rear direction with respect to the back side portions 80. Moreover, when the first lower links 212 are rotated with respect to the back frame 62 and the second lower links 214, the back body 76 is pivoted about the axis of the shoulder bolts 206 (axis running along the seat width direction), these being coupling portions with the upper links 200. Configuring the back adjustment mechanism 170 employing the links to move the back body 76 in the seat front-rear direction with respect to the back side portions 80 and pivot the back body 76 about an axis running along the seat width direction enables a simple configuration to be achieved for the back adjustment mechanism 170.

Moreover, in the present exemplary embodiment, when any of the plural modes is selected by the mode selection switch of the operation section 232, the ECU 230 actuates the cushion adjustment mechanism 110 and the back adjustment mechanism 170 to adopt the state of the selected mode. Accordingly, the occupant P need only operate the mode selection switch (a one-touch operation) to select the desired mode from the plural modes described above in order to adjust their seating posture, greatly facilitating adjustment of the seating posture.

Moreover, when a mode other than the manual driving mode (baseline mode) is selected, in cases in which either one or both of the cushion adjustment mechanism 110 and the back adjustment mechanism 170 are not in the manual driving mode state, the ECU 230 first actuates the one or both the cushion adjustment mechanism 110 and the back adjustment mechanism 170 so as to adopt the manual driving mode state, and then actuates one or both of the cushion adjustment mechanism 110 and the back adjustment mechanism 170 according to the selected mode. This thereby enables the cushion body 42 and the back body 76 to be prevented from interfering with each other during actuation of the cushion adjustment mechanism 110 and/or the back adjustment mechanism 170.

Moreover, the ECU 230 moves the cushion body 42 in the seat upward direction and then pivots the cushion body 42 about the axis running along the seat width direction in cases in which the cushion body 42 is both moved in the seat upward direction and pivoted about the axis running along the seat width direction by the cushion adjustment mechanism 110. Moreover, the ECU 230 pivots the cushion body 42 about the axis running along the seat width direction and then moves the cushion body 42 in the seat downward direction in cases in which the cushion body 42 is both moved in the seat downward direction and pivoted about the axis running along the seat width direction by the cushion adjustment mechanism 110. This thereby enables any discomfort caused to the occupant P during actuation of the cushion adjustment mechanism 110 to be reduced.

Similarly, the ECU 230 moves the back body 76 in the seat front direction and then pivots the back body 76 about the axis running along the seat width direction in cases in which the back body 76 is moved in the seat front direction and pivoted about the axis running along the seat width direction by the back adjustment mechanism 170. Moreover, the ECU 230 pivots the back body 76 about the axis running along the seat width direction and then moves the back body 76 in the seat rear direction in cases in which the back body 76 is moved in the seat rear direction and pivoted about the axis running along the seat width direction by the back adjustment mechanism 170. This thereby enables any discomfort caused to the occupant P during actuation of the back adjustment mechanism 170 to be reduced.

Moreover, when the switch to drive the reclining motor 67 has been operated, in cases in which either one or both of the cushion adjustment mechanism 110 and the back adjustment mechanism 170 is not in the manual driving mode (baseline mode) state, the ECU 230 first actuates the one or both of the cushion adjustment mechanism 110 and the back adjustment mechanism 170 to adopt the manual driving mode state, and only then drives the reclining motor 67. This thereby enables any discomfort caused to the occupant P during actuation of the reclining mechanism 65 to be reduced.

Supplementary Explanation of the Exemplary Embodiment

In the above exemplary embodiment, the front links 140 are configured as single links (one-part links), and the rear links 150 are configured by double links including the first rear links 152 and the second rear links 154. However, the present disclosure is not limited thereto, and the front links may be configured by double links with the rear links being configured by single links, or both the front links and the rear links may be configured by double links.

Moreover, in the above exemplary embodiment, the cushion adjustment mechanism 110 and the back adjustment mechanism 170 are configured including the links described above. However, the present disclosure is not limited thereto, and the configurations of the cushion adjustment mechanism and the back adjustment mechanism may be modified as appropriate. For example, the cushion adjustment mechanism and the back adjustment mechanism may be configured including cylinder or feed screw mechanisms.

Moreover, in the above exemplary embodiment, the cushion adjustment mechanism 110 includes the cushion up-down adjustment motor 128 and the cushion angle adjustment motor 134, and the back adjustment mechanism 170 includes the back front-rear adjustment motor 184 and the back angle adjustment motor 190. However, the above exemplary embodiment is not limited thereto, and the cushion adjustment mechanism and the back adjustment mechanism may have manual configurations (may be moved with manual force).

Moreover, in the above exemplary embodiment, the adjustment mechanism 100 is configured including both the cushion adjustment mechanism 110 and the back adjustment mechanism 170. However, the present disclosure is not limited thereto, and either the cushion adjustment mechanism or the back adjustment mechanism may be omitted.

Various other modifications may be implemented in a range not departing from the spirit of the present disclosure. Moreover, the scope of rights encompassed by the present disclosure is obviously not limited by the above exemplary embodiment.

What is claimed is:

1. A vehicle seat comprising:
  a seat cushion including a cushion body that supports buttocks of an occupant, and cushion side portions disposed on both seat width direction sides of the cushion body;
  a seatback including a back body that supports a back of the occupant, and back side portions disposed on both seat width direction sides of the back body; and
  an adjustment mechanism including at least one of:
    a cushion adjustment mechanism that, on actuation, moves the cushion body in a seat up-down direction with respect to the cushion side portions and pivots the cushion body about an axis running along the seat width direction, or
  a back adjustment mechanism that, on actuation, moves the back body in a seat front-rear direction with respect to the back side portions and pivots the back body about an axis running along the seat width direction, wherein:
  the cushion adjustment mechanism includes:
    a pair of front links, each link having one end portion rotatably coupled to a frame of the seat cushion and having another end portion rotatably coupled to the cushion body, and
    a pair of rear link mechanisms, each rear link mechanism comprising a multi-bar linkage disposed further toward a seat rear side than the pair of front links, and including a pair of first rear links and a pair of second rear links having respective one end portions rotatably coupled to each other, with another end portions of the pair of first rear links being rotatably coupled to the frame of the seat cushion and another end portions of the pair of second rear links being rotatably coupled to the cushion body; and
  the back adjustment mechanism includes:
    a pair of upper links having one end portion rotatably coupled to a frame of the seatback and having another end portion rotatably coupled to the back body, and
    a pair of lower link mechanisms, each lower link mechanism comprising a multi-bar linkage disposed further to a seat lower side than the pair of upper links, and including a pair of first lower links and a pair of second lower links having respective one end portions rotatably coupled to each other, with another end portions of the pair of first lower links being rotatably coupled to the frame of the seatback and another end portions of the pair of second lower links being rotatably coupled to the back body.

2. The vehicle seat of claim 1, further comprising a controller that actuates the at least one of the cushion adjustment mechanism or the back adjustment mechanism such that the at least one of the cushion adjustment mechanism or the back adjustment mechanism adopts a mode selected from a plurality of pre-stored modes.

3. The vehicle seat of claim 2, wherein:
  the adjustment mechanism includes both the cushion adjustment mechanism and the back adjustment mechanism; and
  in cases in which either one or both of the cushion adjustment mechanism and the back adjustment mechanism are not in a state corresponding to a baseline mode when a mode other than the baseline mode has been selected from the plurality of modes, the controller is configured to actuate the one or both of the cushion adjustment mechanism and the back adjustment mechanism so as to adopt the baseline mode state, and then actuates the one or both of the cushion adjustment mechanism and the back adjustment mechanism so as to adopt a state corresponding to the selected mode.

4. The vehicle seat of claim 2, wherein the controller is configured to:
  move the cushion body in a seat upward direction and then pivots the cushion body in cases in which the cushion body is both moved in the seat upward direction and pivoted by the cushion adjustment mechanism;
  pivot the cushion body and then moves the cushion body in a seat downward direction in cases in which the cushion body is both moved in the seat downward direction and pivoted by the cushion adjustment mechanism;
  move the back body in a seat front direction and then pivots the cushion body in cases in which the back body is both moved in the seat front direction and pivoted by the back adjustment mechanism; and
  pivot the back body and then moves the back body in a seat rear direction in cases in which the back body is both moved in the seat rear direction and pivoted by the back adjustment mechanism.

5. The vehicle seat of claim 2, further comprising a reclining mechanism that on actuation pivots the seatback with respect to the seat cushion, wherein:
  in cases in which the at least one of the cushion adjustment mechanism or the back adjustment mechanism is not in a state corresponding to a baseline mode when there has been an actuation request for the reclining mechanism, the controller is configured to actuate the at least one of the cushion adjustment mechanism or the back adjustment mechanism so as to adopt the baseline mode state before actuating the reclining mechanism.

6. A vehicle seat comprising:
  a seat cushion including a cushion body that supports buttocks of an occupant, and cushion side portions disposed on both seat width direction sides of the cushion body;

a seatback including a back body that supports a back of the occupant, and back side portions disposed on both seat width direction sides of the back body; and an adjustment mechanism including at least one of:
- a cushion adjustment mechanism that is capable of moving the cushion body in a seat up-down direction with respect to the cushion side portions and is capable of pivoting the cushion body about an axis running along the seat width direction, or
- a back adjustment mechanism that is capable of moving the back body in a seat front-rear direction with respect to the back side portions and is capable of pivoting the back body about an axis running along the seat width direction, wherein:

the cushion adjustment mechanism includes:
- a pair of front links, each link having one end portion rotatably coupled to a frame of the seat cushion and having another end portion rotatably coupled to the cushion body, and
- a pair of rear link mechanisms, each rear link mechanism comprising a multi-bar linkage disposed further toward a seat rear side than the pair of front links, and including a pair of first rear links and a pair of second rear links having respective one end portions rotatably coupled to each other, with another end portions of the pair of first rear links being rotatably coupled to the frame of the seat cushion and another end portions of the pair of second rear links being rotatably coupled to the cushion body; and the back adjustment mechanism includes:
- a pair of upper links having one end portion rotatably coupled to a frame of the seatback and having another end portion rotatably coupled to the back body, and
- a pair of lower link mechanisms, each lower link mechanism comprising a multi-bar linkage disposed further to a seat lower side than the pair of upper links, and including a pair of first lower links and a pair of second lower links having respective one end portions rotatably coupled to each other, with another end portions of the pair of first lower links being rotatably coupled to the frame of the seatback and another end portions of the pair of second lower links being rotatably coupled to the back body.

7. A vehicle seat comprising:
a seat cushion including a cushion body that supports buttocks of an occupant, and cushion side portions disposed on both seat width direction sides of the cushion body;

a seatback including a back body that supports a back of the occupant, and back side portions disposed on both seat width direction sides of the back body;

an adjustment mechanism including at least one of:
- a cushion adjustment mechanism that, on actuation, moves the cushion body in a seat up-down direction with respect to the cushion side portions and pivots the cushion body about an axis running along the seat width direction, or
- a back adjustment mechanism that, on actuation, moves the back body in a seat front-rear direction with respect to the back side portions and pivots the back body about an axis running along the seat width direction; and a controller that actuates the at least one of the cushion adjustment mechanism or the back adjustment mechanism such that the at least one of the cushion adjustment mechanism or the back adjustment mechanism adopts a mode selected from a plurality of pre-stored modes, wherein:

the adjustment mechanism includes both the cushion adjustment mechanism and the back adjustment mechanism; and in cases in which either one or both of the cushion adjustment mechanism and the back adjustment mechanism are not in a state corresponding to a baseline mode when a mode other than the baseline mode has been selected from the plurality of modes, the controller is configured to actuate the one or both of the cushion adjustment mechanism and the back adjustment mechanism so as to adopt the baseline mode state, and then actuates the one or both of the cushion adjustment mechanism and the back adjustment mechanism so as to adopt a state corresponding to the selected mode.

* * * * *